US009568905B2

(12) United States Patent
Nishiyama et al.

(10) Patent No.: US 9,568,905 B2
(45) Date of Patent: Feb. 14, 2017

(54) CPU OF PLC, SYSTEM PROGRAM FOR PLC, AND RECORDING MEDIUM STORING SYSTEM PROGRAM FOR PLC

(71) Applicant: OMRON CORPORATION, Kyoto (JP)

(72) Inventors: Yoshihide Nishiyama, Kanagawa (JP); Osamu Hamasaki, Kyoto (JP); Shigeyuki Eguchi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 743 days.

(21) Appl. No.: 14/017,720

(22) Filed: Sep. 4, 2013

(65) Prior Publication Data

US 2014/0005808 A1    Jan. 2, 2014

Related U.S. Application Data

(63) Continuation of application No. PCT/JP2011/056773, filed on Mar. 22, 2011.

(30) Foreign Application Priority Data

Mar. 15, 2011   (JP) .................. 2011-056774

(51) Int. Cl.
  *G06F 3/00*      (2006.01)
  *G05B 19/042*    (2006.01)
  *G05B 19/05*     (2006.01)

(52) U.S. Cl.
  CPC .......... *G05B 19/0426* (2013.01); *G05B 19/05* (2013.01)

(58) Field of Classification Search
  CPC ..................... G06F 12/0246; G06F 3/0659
  (Continued)

(56) References Cited

U.S. PATENT DOCUMENTS 7,430,451 B2    9/2008  Muneta et al.
7,813,813 B2   10/2010  Muneta et al.
(Continued)

FOREIGN PATENT DOCUMENTS

JP    08-235054    9/1996
JP    10-136186    5/1998
(Continued)

OTHER PUBLICATIONS

U.S. Appl. No. 14/017,904 to Yoshihide Nishiyama et al., filed Sep. 4, 2013.
(Continued)

*Primary Examiner* — Titus Wong
(74) *Attorney, Agent, or Firm* — Greenblum & Bernstein, P.L.C.

(57) ABSTRACT

A microprocessor controls at least one of a first communication circuit and a second communication circuit such that a first input/output process and a second input/output process are executed in parallel. The first input/output process includes a process outputting output data from a first transfer buffer, through the first communication circuit, to a first instrument in a PLC system bus, and a process inputting input data from the first instrument, through the first communication circuit, to the first transfer buffer. The second input/output process includes a process outputting output data from a second transfer buffer, through the second communication circuit, to a second instrument in a field network, and a process inputting input data from the second instrument, through the second communication circuit, to the second transfer buffer.

27 Claims, 22 Drawing Sheets

(58) Field of Classification Search
USPC .......................................................... 710/21
See application file for complete search history.

(56) References Cited

U.S. PATENT DOCUMENTS

2004/0210326 A1 10/2004 Muneta et al.
2008/0306613 A1 12/2008 Muneta et al.

FOREIGN PATENT DOCUMENTS

JP         2003-029809       1/2003
JP         2007-242036       9/2007

OTHER PUBLICATIONS

U.S. Appl. No. 14/017,929 to Yoshihide Nishiyama et al., filed Sep. 4, 2013.
U.S. Appl. No. 14/017,684 to Yoshihide Nishiyama et al., filed Sep. 4, 2013.
International Search Report in PCT/JP2011/056773, along with English language translation, mailing date Jun. 14, 2011.
International Preliminary Report on Patentability in PCT/JP2011/056773, along with an English language translation, dated Feb. 10, 2012.

CPU OF PLC, SYSTEM PROGRAM FOR PLC, AND RECORDING MEDIUM STORING SYSTEM PROGRAM FOR PLC

RELATED APPLICATIONS

This application is a continuation application of International Application No. PCT/JP2011/056773, filed Mar. 22, 2011, and claims the benefit of Japanese Application No. 2011-056774, filed Mar. 15, 2011, the disclosures of which are incorporated by reference herein in their entireties.

FIELD OF THE INVENTION

The present invention relates to an output process and an input process in a PLC (Programmable Logic Controller) used for controlling operations of a machine, equipment, and the like.

BACKGROUND OF THE INVENTION

A PLC is configured, for example, by a plurality of units such as a CPU (Central Processing Unit) unit that includes a microprocessor executing a control program, or an I/O (Input/Output) unit that manages signal input from an exterior switch or sensor and signal output to an exterior relay or actuator. The PLC executes a control operation while transferring data among these units through a PLC system bus and/or field network for each execution cycle of the control program.

For example, Patent Literature 1 (Japanese Patent Laid-open Publication No. 2003-29809) discloses a configuration in which a CPU unit of a PLC performs communication in order to transfer I/O data through an I/O bus (PLC system bus) between local I/O units, and also performs communication in order to transfer I/O data through a network (field network) between remote I/O slaves. Input/output between the local I/O units and input/output between the remote I/O slaves is performed in parallel. In the CPU unit, the I/O data is stored in a data memory. An arbiter is included which controls access to the data memory. In order to transfer the I/O data through the I/O bus, a PLC command executor accesses the data memory through the arbiter. Communication through the I/O bus is performed by the PLC command executor using an I/O bus I/F portion. In order to transfer the I/O data through the network, a remote I/O master accesses the data memory through the arbiter. Moreover, the data memory is also accessed when the PLC command executor executes a command (control program). In other words, the data memory is used as a shared memory and, while being mediated by the arbiter, identical data memory is accessed for data transfer through the I/O bus, data transfer through the network, and execution of the control program.

RELATED ART

Patent Literature

Patent Literature 1: Japanese Patent Laid-open Publication No. 2003-029809

SUMMARY OF THE INVENTION

Problems to be Solved by the Invention

In a PLC, ASIC (developed specifically as a control program executor) is used and architecture of an entire CPU unit is also independently developed by each PLC manufacturer. However, accompanying performance improvement of general-purpose microprocessors used in general-purpose computers, a general-purpose microprocessor has come to be employable as the control program executor of the PLC in recent years. When the CPU unit of the PLC is configured using the general-purpose microprocessor, the architecture of the entire CPU unit is as close as possible to that of a general-purpose computer, which is preferable from a vantage of reducing development burdens, costs, and so on. In such a case, as indicated in Patent Literature 1, a configuration accessing identical data memory through the arbiter for any of input/output through the PLC system bus, input/output through the field network, and execution of the control program differs greatly from the architecture of the general-purpose computer and cannot be said to be preferred.

The present invention has as an object to provide a means executing in parallel input/output of data through a PLC system bus and input/output of data through a field network, the means being suitable for achievement using a hardware configuration close to that of a general-purpose computer.

Means for Solving the Problems

According to an aspect of the present invention, a CPU unit of a PLC controlling a control target is provided. The CPU unit of the PLC includes a microprocessor, a memory means including a main memory of the microprocessor, a first communication circuit transmitting first output data and receiving first input data with a PLC system bus, and a second communication circuit transmitting second output data and receiving second input data with a field network. The CPU unit of the PLC is configured to control the control target by repeating transmission of the first output data and the second output data, reception of the first input data and the second input data, and execution of a control program using the first input data and the second input data to generate the first output data and the second output data. The memory means is used for storage of the control program and a system program. The microprocessor executes the system program and the control program stored in the memory means. The system program includes a command generating, in the main memory, a calculation buffer in which, accompanying execution of the control program, the first input data and the second input data are read and the first output data and the second output data are written; a first transfer buffer storing the first output data transmitted by the PLC system bus and the first input data received by the PLC system bus; and a second transfer buffer storing the second output data transmitted by the field network and the second input data received by the field network. The system program further includes a command controlling execution of the control program and a command controlling input/output of the first input data, the second input data, the first output data, and the second output data. The microprocessor controls, by executing the system program, execution of an output copy process and an input copy process, the output copy process copying the first output data from the calculation buffer to the first transfer buffer and copying the second output data from the calculation buffer to the second transfer buffer, and the input copy process copying the first input data from the first transfer buffer to the calculation buffer and copying the second input data from the second transfer buffer to the calculation buffer. Moreover, the microprocessor controls, by executing the system program, at least one of the first communication circuit and the second communication circuit such that a first input/output process and a second input/output process are executed in parallel. The first input/output process includes a process outputting the first output data from the first transfer buffer, through the first communication circuit, to a first instrument in the PLC system bus, and a process inputting the first input data from the first instrument, through the first communication circuit, to the first transfer buffer. The second input/output process includes a process outputting the second output data from the second transfer buffer, through the second communication circuit, to a second instrument in the field network, and a process inputting the second input data from the second instrument, through the second communication circuit, to the second transfer buffer.

Preferably, the first communication circuit includes a first communication circuit buffer, and the second communication circuit includes a second communication circuit buffer. The first input/output process includes a first output transfer process transferring the first output data from the first transfer buffer to the first communication circuit buffer; a first transmission process transmitting the first output data from the first communication circuit buffer to the first instrument; a first reception process receiving the first input data from the first instrument to the first communication circuit buffer; and a first input transfer process transferring the first input data from the first communication circuit buffer to the first transfer buffer. The second input/output process includes a second output transfer process transferring the second output data from the second transfer buffer to the second communication circuit buffer; a second transmission process transmitting the second output data from the second communication circuit buffer to the second instrument; a second reception process receiving the second input data from the second instrument to the second communication circuit buffer; and a second input transfer process transferring the second input data from the second communication circuit buffer to the second transfer buffer.

More preferably, the microprocessor controls, by executing the system program, at least one of the first communication circuit and the second communication circuit such that, during a period from one of the first output transfer process and the second output transfer process being initiated until the input transfer process corresponding to the output transfer process is completed, the other of the output transfer processes is initiated.

More preferably, alternatively, the microprocessor controls, by executing the system program, at least one of the first communication circuit and the second communication circuit such that, during a period from one of a first transmission/reception process (being the first transmission process and the first reception process) and a second transmission/reception process (being the second transmission process and the second reception process) being initiated until the transmission/reception process is completed, the other of the transmission/reception processes is initiated.

Preferably, alternatively, the first input/output process includes a first output process outputting the first output data from the first transfer buffer to the first instrument, and a first input process inputting the first input data from the first instrument to the first transfer buffer. The second input/output process includes a second output process outputting the second output data from the second transfer buffer to the second instrument, and a second input process inputting the second input data from the second instrument to the second transfer buffer. The microprocessor performs control, by executing the system program, such that at least one is performed of parallel execution of the first output process and the second output process and parallel execution of the first input process and the second input process.

More preferably, alternatively, the microprocessor controls, by executing the system program, at least one of the first communication circuit and the second communication circuit such that, during a period from one of the first output transfer process and the second output transfer process being initiated until the transmission process corresponding to the output transfer process is completed, the other of the output transfer processes is initiated.

More preferably, alternatively, the microprocessor controls, by executing the system program, at least one of the first communication circuit and the second communication circuit such that, during a period from one of the first transmission process and the second transmission process being initiated until the transmission process is completed, the other of the transmission processes is initiated.

More preferably, alternatively, the microprocessor controls, by executing the system program, at least one of the first communication circuit and the second communication circuit such that, during a period from one of the first reception process and the second reception process being initiated until the input transfer process corresponding to the reception process is completed, the other of the reception processes is initiated.

More preferably, alternatively, the microprocessor controls, by executing the system program, at least one of the first communication circuit and the second communication circuit such that, during a period from one of the first reception process and the second reception process being initiated until the reception process is completed, the other of the reception processes is initiated.

According to another aspect of the present invention, a system program for a PLC is provided for a CPU unit of the PLC, the system program being stored in a memory means and being executed by a microprocessor. The CPU unit includes the microprocessor; the memory means including a main memory of the microprocessor; a first communication circuit transmitting first output data and receiving first input data with a PLC system bus; and a second communication circuit transmitting second output data and receiving second input data with a field network. The CPU unit controls a control target by repeating transmission of the first output data and the second output data, reception of the first input data and the second input data, and execution of a control program stored in the memory means and using the first input data and the second input data to generate the first output data and the second output data. The system program includes, as an execution preparation command of a control operation, a command generating, in the main memory, a calculation buffer in which, accompanying execution of the control program, the first input data and the second input data are read and the first output data and the second output data are written; a first transfer buffer storing the first output data transmitted by the PLC system bus and the first input data received by the PLC system bus; and a second transfer buffer storing the second output data transmitted by the field network and the second input data received by the field network. The system program includes, as an execution control command of the control operation, a control program initiation command initiating execution of the control program; a first output copy command for copying the first output data from the calculation buffer to the first transfer buffer; a second output copy command for copying the second output data from the calculation buffer to the second transfer buffer; a first input copy command for copying the first input data from the first transfer buffer to the calculation buffer; a second input copy command for copying the second input data from the second transfer buffer to the calculation buffer; and an input/output control command of at least one of a first input/output control command for controlling the first communication circuit and a second input/output control command for controlling the second communication circuit. The input/output control command is configured such that a first input/output process and a second input/output process are executed in parallel. The first input/output process includes a process outputting the first output data from the first transfer buffer, through the first communication circuit, to a first instrument in the PLC system bus, and a process inputting the first input data from the first instrument, through the first communication circuit, to the first transfer buffer. The second input/output process includes a process outputting the second output data from the second transfer buffer, through the second communication circuit, to a second instrument in the field network, and a process inputting the second input data from the second instrument, through the second communication circuit, to the second transfer buffer.

Preferably, the first communication circuit includes a first communication circuit buffer and the second communication circuit includes a second communication circuit buffer. The first input/output process includes a first output transfer process transferring the first output data from the first transfer buffer to the first communication circuit buffer; a first transmission process transmitting the first output data from the first communication circuit buffer to the first instrument; a first reception process receiving the first input data from the first instrument to the first communication circuit buffer; and a first input transfer process transferring the first input data from the first communication circuit buffer to the first transfer buffer. The second input/output process includes a second output transfer process transferring the second output data from the second transfer buffer to the second communication circuit buffer; a second transmission process transmitting the second output data from the second communication circuit buffer to the second instrument; a second reception process receiving the second input data from the second instrument to the second communication circuit buffer; and a second input transfer process transferring the second input data from the second communication circuit buffer to the second transfer buffer. The first input/output control command includes any of a first output transfer command initiating the first output transfer process; a first transmission command initiating the first transmission process; a first reception command initiating the first reception process; a first transmission/reception command initiating the first transmission process and the first reception process; and a first input transfer command initiating the first input transfer process. The second input/output control command includes any of a second output transfer command initiating the second output transfer process; a second transmission command initiating the second transmission process; a second reception command initiating the second reception process; a second transmission/reception command initiating the second transmission process and the second reception process; and a second input transfer command initiating the second input transfer process.

More preferably, the system program includes the first output transfer command and the second output transfer command, and is programmed such that, during a period from one of the output transfer commands being executed until the input transfer process corresponding to the output transfer process initiated thereby is completed, the other of the output transfer commands is executed.

More preferably, alternatively, the system program includes the first transmission/reception command and the second transmission/reception command, and is programmed such that, during a period from one of the transmission/reception commands being executed until the transmission/reception process initiated thereby is completed, the other of the transmission/reception commands is executed.

More preferably, alternatively, the first input/output process includes a first output process outputting the first output data from the first transfer buffer to the first instrument, and a first input process inputting the first input data from the first instrument to the first transfer buffer. The second input/output process includes a second output process outputting the second output data from the second transfer buffer to the second instrument, and a second input process inputting the second input data from the second instrument to the second transfer buffer. The first input/output control command includes a first output command initiating the first output process and a first input command initiating the first input process. The second input/output control command includes a second output command initiating the second output process and a second input command initiating the second input process. The system program includes at least one of parallel execution of the first output process and the second output process by executing the first output command and the second output command, and parallel execution of the first input process and the second input process by executing the first input command and the second input command.

More preferably, alternatively, the system program includes the first output transfer command and the second output transfer command, and is programmed such that, during a period from one of the output transfer commands being executed until the transmission process corresponding to the output transfer process initiated thereby is completed, the other of the output transfer commands is executed.

Preferably, alternatively, the system program includes the first transmission command and the second transmission command, and is programmed such that, during a period from one of the transmission commands being executed until the transmission process initiated thereby is completed, the other of the transmission commands is executed.

More preferably, alternatively, the system program includes the first reception command and the second reception command, and is programmed such that, during a period from one of the reception commands being executed until the input transfer process corresponding to the reception process initiated thereby is completed, the other of the reception commands is executed.

Preferably, alternatively, the system program includes the first reception command and the second reception command, and is programmed such that, during a period from one of the reception commands being executed until the reception process initiated thereby is completed, the other of the reception commands is executed.

According to another aspect of the present invention, a recording medium storing a system program for a PLC is provided in a CPU unit of the PLC, the system program being stored in a memory means and being executed by a microprocessor. The CPU unit includes the microprocessor; the memory means including a main memory of the microprocessor; a first communication circuit transmitting first output data and receiving first input data with a PLC system bus; and a second communication circuit transmitting second output data and receiving second input data with a field network. The CPU unit controls a control target by repeating transmission of the first output data and the second output data, reception of the first input data and the second input data, and execution of a control program stored in the memory means and using the first input data and the second input data to generate the first output data and the second output data. The system program includes, as an execution preparation command of a control operation, a command generating, in the main memory, a calculation buffer in which, accompanying execution of the control program, the first input data and the second input data are read and the first output data and the second output data are written; a first transfer buffer storing the first output data transmitted by the PLC system bus and the first input data received by the PLC system bus; and a second transfer buffer storing the second output data transmitted by the field network and the second input data received by the field network. The system program includes, as an execution control command of the control operation, a control program initiation command initiating execution of the control program; a first output copy command for copying the first output data from the calculation buffer to the first transfer buffer; a second output copy command for copying the second output data from the calculation buffer to the second transfer buffer; a first input copy command for copying the first input data from the first transfer buffer to the calculation buffer; a second input copy command for copying the second input data from the second transfer buffer to the calculation buffer; and an input/output control command of at least one of a first input/output control command for controlling the first communication circuit and a second input/output control command for controlling the second communication circuit. The input/output control command is configured such that a first input/output process and a second input/output process are executed in parallel. The first input/output process includes a process outputting the first output data from the first transfer buffer, through the first communication circuit, to a first instrument in the PLC system bus, and a process inputting the first input data from the first instrument, through the first communication circuit, to the first transfer buffer. The second input/output process includes a process outputting the second output data from the second transfer buffer, through the second communication circuit, to a second instrument in the field network, and a process inputting the second input data from the second instrument, through the second communication circuit, to the second transfer buffer.

Preferably, the first communication circuit includes the first communication circuit buffer and the second communication circuit includes the second communication circuit buffer. The first input/output process includes a first output transfer process transferring the first output data from the first transfer buffer to the first communication circuit buffer; a first transmission process transmitting the first output data from the first communication circuit buffer to the first instrument; a first reception process receiving the first input data from the first instrument to the first communication circuit buffer; and a first input transfer process transferring the first input data from the first communication circuit buffer to the first transfer buffer. The second input/output process includes a second output transfer process transferring the second output data from the second transfer buffer to the second communication circuit buffer; a second transmission process transmitting the second output data from the second communication circuit buffer to the second instrument; a second reception process receiving the second input data from the second instrument to the second communication circuit buffer; and a second input transfer process transferring the second input data from the second communication circuit buffer to the second transfer buffer. The first input/output control command includes any of a first output transfer command initiating the first output transfer process; a first transmission command initiating the first transmission process; a first reception command initiating the first reception process; a first transmission/reception command initiating the first transmission process and the first reception process; and a first input transfer command initiating the first input transfer process. The second input/output control command includes any of a second output transfer command initiating the second output transfer process; a second transmission command initiating the second transmission process; a second reception command initiating the second reception process; a second transmission/reception command initiating the second transmission process and the second reception process; and a second input transfer command initiating the second input transfer process.

More preferably, the system program includes the first output transfer command and the second output transfer command, and is programmed such that, during a period from one of the output transfer commands being executed until the input transfer process corresponding to the output transfer process initiated thereby is completed, the other of the output transfer commands is executed.

More preferably, alternatively, the system program includes the first transmission/reception command and the second transmission/reception command, and is programmed such that, during a period from one of the transmission/reception commands being executed until the transmission/reception process initiated thereby is completed, the other of the transmission/reception commands is executed.

More preferably, alternatively, the first input/output process includes a first output process outputting the first output data from the first transfer buffer to the first instrument, and a first input process inputting the first input data from the first instrument to the first transfer buffer. The second input/output process includes a second output process outputting the second output data from the second transfer buffer to the second instrument, and a second input process inputting the second input data from the second instrument to the second transfer buffer. The first input/output control command includes a first output command initiating the first output process and a first input command initiating the first input process. The second input/output control command includes a second output command initiating the second output process and a second input command initiating the second input process. The system program includes at least one of parallel execution of the first output process and the second output process by executing the first output command and the second output command, and parallel execution of the first input process and the second input process by executing the first input command and the second input command.

More preferably, alternatively, the system program includes the first output transfer command and the second output transfer command, and is programmed such that, during a period from one of the output transfer commands being executed until the transmission process corresponding to the output transfer process initiated thereby is completed, the other of the output transfer commands is executed.

Preferably, alternatively, the system program includes the first transmission command and the second transmission command, and is programmed such that, during a period from one of the transmission commands being executed until the transmission process initiated thereby is completed, the other of the transmission commands is executed.

More preferably, alternatively, the system program includes the first reception command and the second reception command, and is programmed such that, during a period from one of the reception commands being executed until the input transfer process corresponding to the reception process initiated thereby is completed, the other of the reception commands is executed.

Preferably, alternatively, the system program includes the first reception command and the second reception command, and is programmed such that, during a period from one of the reception commands being executed until the reception process initiated thereby is completed, the other of the reception commands is executed.

Moreover, in the present specification "command" ("meirei" in Japanese) is not limited to individual commands appearing in source code of a program in order to achieve a given function, but instead also refers to an aggregation of such individual commands, mathematical functions, and the like and may be expressed in a plural form, as in "instructions" in English, for example.

Effect of the Invention

According to the present invention, a CPU unit of a PLC can be achieved that is capable of executing in parallel input/output through a PLC system bus and input/output of data through a field network while employing a hardware configuration close to that of a general-purpose computer.

MODE FOR CARRYING OUT THE INVENTION

Figure 1:
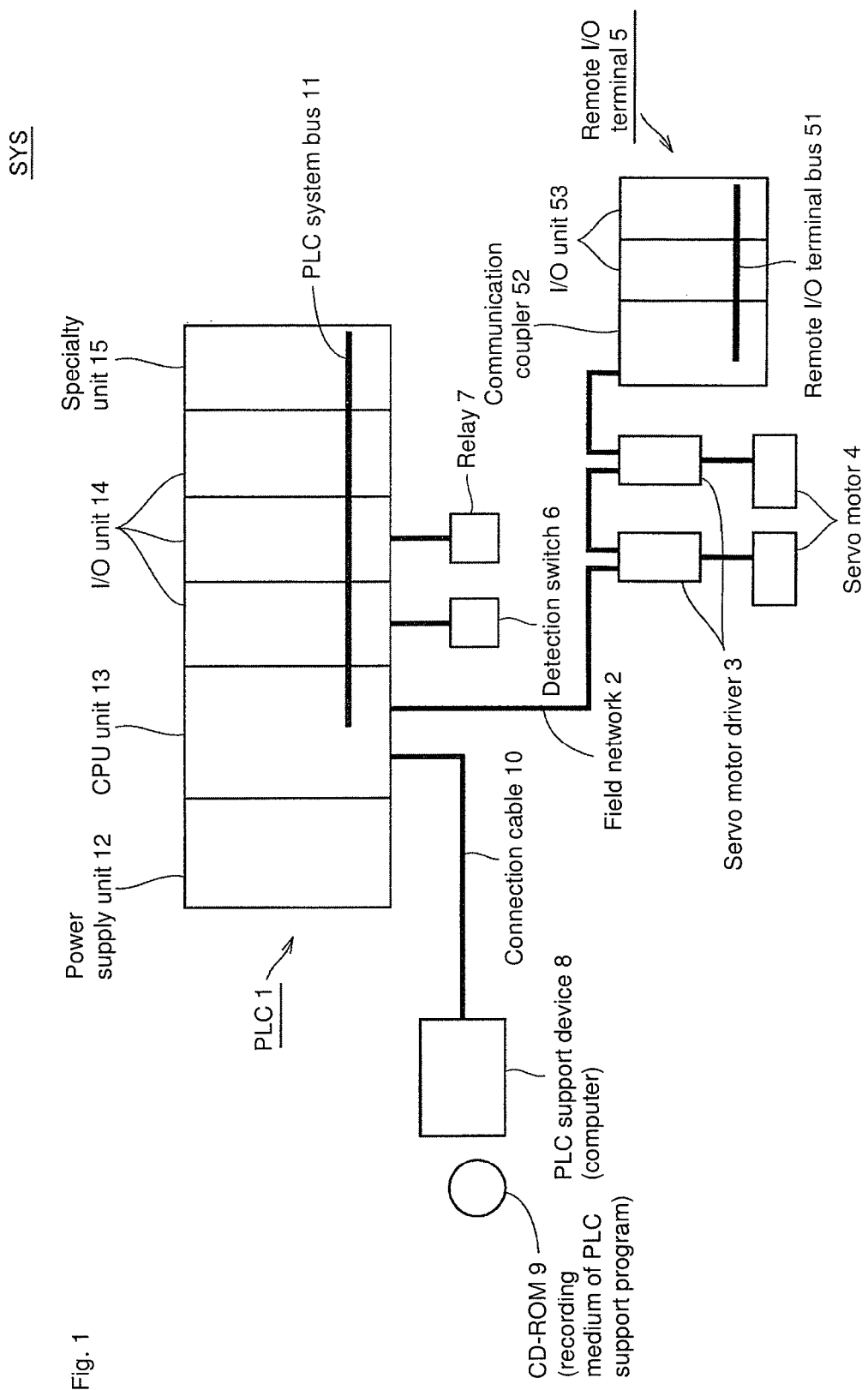
FIG. 1 is a schematic view illustrating an overview configuration of a PLC system according to embodiments of the present invention.

A detailed description of embodiments according to the present invention is given with reference to the drawings. Identical or equivalent portions in the drawings are given identical reference symbols and descriptions thereof are not reiterated.

A. System Configuration

A PLC according to the present embodiments controls a control target such as a machine or equipment. The PLC according to the present embodiments includes a CPU unit as a constituent element. The CPU unit includes a microprocessor, a memory means including a main memory of the microprocessor, and a communication circuit. The CPU unit of the PLC according to the present embodiments is configured to control the control target by repeating transmission of output data, reception of input data, and execution of a control program using the input data to generate the output data.

The memory means is used for storage of the control program and a system program controlling execution of the control program and input/output of the input data and the output data. The microprocessor executes the system program and the control program stored in the memory means.

The communication circuit transmits the output data and receives the input data. As noted below, the PLC according to the present embodiments includes, as the communication circuit, a first communication circuit transmitting the output data and receiving the input data with a PLC system bus and a second communication circuit transmitting the output data and receiving the input data with a field network.

First, with reference to FIG. 1, a description is given of a system configuration of a PLC 1 according to the present embodiments. FIG. 1 is a schematic view illustrating an overview configuration of a PLC system according to embodiments of the present invention. With reference to FIG. 1, a PLC system SYS includes the PLC 1, a servo motor driver 3 and remote I/O terminal 5 connected to the PLC 1 by a field network 2, and a detection switch 6 and relay 7 configuring a field instrument. In addition, a PLC support device 8 is connected to the PLC 1 via a connection cable 10 or the like.

The PLC 1 includes a CPU unit 13 executing a principal calculation process, one or more I/O units 14, and a specialty unit 15. These units are configured so as to be capable of mutually exchanging data via a PLC system bus 11. Further, power of an appropriate voltage is supplied to these units by a power supply unit 12. In addition, each unit configuring the PLC 1 is provided by a PLC manufacturer; therefore, the PLC system bus 11 is typically independently developed and used by the PLC manufacturer. In contrast, the field network 2 described below is often capable of connecting products from different manufacturers and standards for these products are often publicly available.

Details of the CPU unit 13 are noted below with reference to FIG. 2. The I/O unit 14 is a unit related to general input/output processing and handles input/output of data binarized to be ON or OFF. In other words, the I/O unit 14 collects information about whether a sensor such as the detection switch 6 is detecting some target (is ON) or not detecting some target (is OFF). In addition, the I/O unit 14 outputs to an output (such as the relay 7 or an actuator) one of an instruction to activate (ON) and an instruction to deactivate (OFF).

The specialty unit 15 includes functions not supported by the I/O unit 14, such as input/output of analog data, temperature control, and communication using a specific communication method.

The field network 2 transmits various kinds of data exchanged with the CPU unit 13. As the field network 2, typically, various kinds of industrial Ethernets® can be used. Known examples of the industrial Ethernet® include EtherCAT®, Profinet IRT, MECHATROLINK®-III, Powerlink, SERCOS®-III, and CIP Motion, any of which may be used. Moreover, a field network other than the industrial Ethernet® may also be used. For example, when motion control is not performed, DeviceNet, CompoNet/IP®, or the like may be used. In the PLC system SYS according to the present embodiments, a representative example is given in the present embodiments of a configuration where the industrial Ethernet® EtherCAT® is used as the field network 2.

In addition, by allocating functions of the I/O unit 14 and the servo motor driver 3 to the CPU unit 13, the PLC 1 may have a configuration in which the CPU unit 13 directly controls a control target without mediation by the I/O unit 14, the servo motor driver 3, or the like, to an extent allowed by such internal functions.

The servo motor driver 3 is connected to the CPU unit 13 via the field network 2, and also drives the servo motor 4 according to an instruction value from the CPU unit 13. More specifically, the servo motor driver 3 receives from the PLC 1, at a constant period, an instruction value such as a position instruction value, speed instruction value, and torque instruction value. Further, the servo motor driver 3 obtains, from a detector such as a position sensor (rotary encoder) or torque sensor connected to a shaft of the servo motor 4, an actual measured value for movement of the servo motor 4 such as position, speed (typically calculated based on a difference between a current location and a previous location), and torque. Also, the servo motor driver 3 sets the instruction value from the CPU unit 13 to a desired value, then performs feedback control to produce a feedback value from the actual measured value. In other words, the servo motor driver 3 adjusts an electric current driving the servo motor 4 such that the actual measured value approaches the desired value. Moreover, the servo motor driver 3 may also be called a servo motor amplifier.

FIG. 1 depicts an exemplary system in which the servo motor 4 and the servo motor driver 3 are combined. However, other configurations can also be used, such as a system in which a pulse motor and a pulse motor driver are combined.

The remote I/O terminal 5 is further connected to the field network 2 of the PLC system SYS shown in FIG. 1. The remote I/O terminal 5, basically, performs processes related to general input/output processing similar to the I/O unit 14. More specifically, the remote I/O terminal 5 includes a communication coupler 52 for performing a process related to data transmission in the field network 2, and one or more I/O units 53. These units are configured so as to be capable of mutually exchanging data via a remote I/O terminal bus 51.

The PLC support device 8 is described below.

B. Hardware Configuration of CPU Unit

Figure 2:
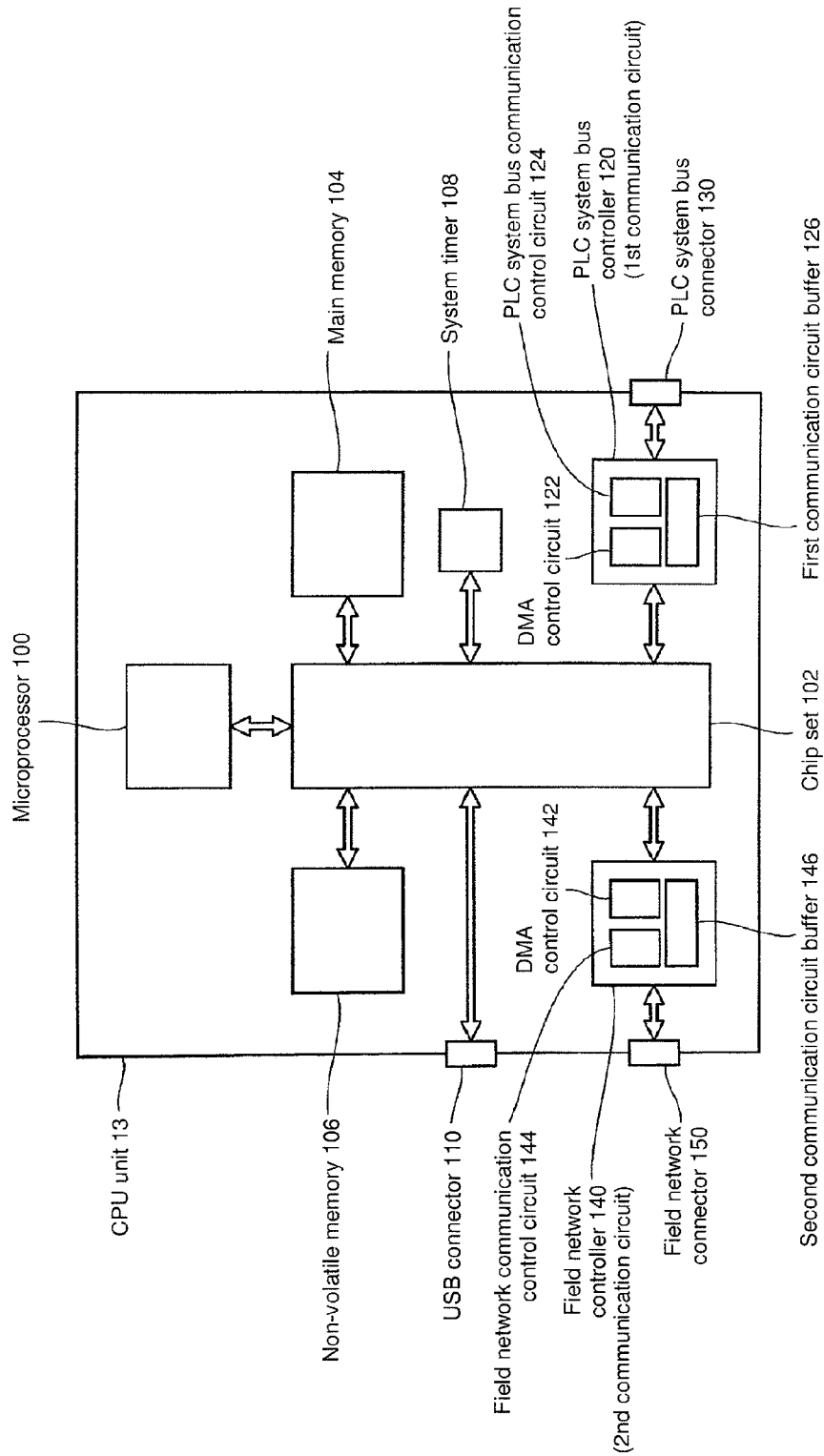
FIG. 2 is a schematic view illustrating a hardware configuration of a CPU unit according to the embodiments of the present invention.

Next, with reference to FIG. 2, a description is given of a hardware configuration of the CPU unit 13. FIG. 2 is a schematic view illustrating a hardware configuration of the CPU unit 13 according to embodiments of the present invention. With reference to FIG. 2, the CPU unit 13 includes a microprocessor 100, a chip set 102, a main memory 104, a non-volatile memory 106, a system timer 108, a PLC system bus controller 120, a field network controller 140, and a USB connector 110. Connections between the chip set 102 and other components are each made by various types of bus.

The microprocessor 100 and the chip set 102, typically, are configured according to a general-purpose computer architecture. In other words, the microprocessor 100 interprets and executes an instruction code serially supplied from the chip set 102 according to an internal clock. The chip set 102 exchanges internal data with various connected components and also generates the required instruction code for the microprocessor 100. Moreover, the chip set 102 includes a function caching data and the like obtained as a result of executing a calculation process in the microprocessor 100.

The CPU unit 13 includes the main memory 104 and the non-volatile memory 106 as memory means.

The main memory 104 is a volatile storage area (RAM) and holds various programs to be executed by the microprocessor 100 after power is supplied to the CPU unit 13. In addition, the main memory 104 is used as a task memory during execution of various programs by the microprocessor 100. A device such as a DRAM (Dynamic Random Access Memory) or SRAM (Static Random Access Memory) is used as the main memory 104 of this kind.

Meanwhile, the non-volatile memory 106 holds, in a non-volatile manner, data such as a real-time OS (Operating System), PLC 1 system program, a user program, a motion calculation program, and system setting parameters. These programs and data are copied to the main memory 104 as needed to enable the microprocessor 100 to access them. A semiconductor memory, such as a flash memory, can be used as the non-volatile memory 106 of this kind. Alternatively, a magnetic recording medium such as a hard disk drive or an optical recording medium such as a DVD-RAM (Digital Versatile Disk Random Access Memory) or the like can be used.

The system timer 108 generates an interrupt signal in each constant period and provides the interrupt signal to the microprocessor 100. Typical configurations generate the interrupt signals on a plurality of different cycles according to hardware specifications. However, the interrupt signal can also be set to generate on a desired cycle according to an OS (Operating System), BIOS (Basic Input Output System), or the like. Using the interrupt signal generated by the system timer 108, a control operation is achieved for each control cycle (described below).

The CPU unit 13 includes the PLC system bus controller 120 and the field network controller 140 as communication circuits. These communication circuits transmit output data and receive input data.

Moreover, in the case where the CPU unit 13 is allocated the functions of the I/O unit 14 and the servo motor driver 3, transmission of output data and reception of input data by the PLC system bus controller 120 treat the component serving those functions as a recipient of the communication, and so transmission and reception are performed within the CPU unit 13.

The PLC system bus controller 120 (first communication circuit) controls the exchange of data via the PLC system bus 11. More specifically, the PLC system bus controller 120 includes a DMA (Dynamic Memory Access) control circuit 122, a PLC system bus communication control circuit 124, and a first communication circuit buffer 126. Moreover, the PLC system bus controller 120 is internally connected to the PLC system bus 11 via a PLC system bus connector 130.

The first communication circuit buffer 126 acts as a transmission buffer of data output to another unit via the PLC system bus 11 (hereafter referred to as either "output data" or "first output data") and as a reception buffer of data input from another unit via the PLC system bus 11 (hereafter referred to as either "input data" or "first input data"). Moreover, the first output data generated according to the calculation process by the microprocessor 100 is primitively stored in the main memory 104. Further, the first output data, which is to be transferred to a specific unit, is retrieved from the main memory 104 and initially held in the first communication circuit buffer 126. The first input data, which is transferred from the other unit, is moved to the main memory 104 after being initially held in the first communication circuit buffer 126.

The DMA control circuit 122 performs transfer of the first output data from the main memory 104 to the first communication circuit buffer 126 and transfer of the first input data from the first communication circuit buffer 126 to the main memory 104.

The PLC system bus communication control circuit 124 performs, between the other unit connected to the PLC system bus 11, a process transmitting the first output data of the first communication circuit buffer 126 and a process receiving the first input data and storing the first input data in the first communication circuit buffer 126. Typically, the PLC system bus communication control circuit 124 provides a function of a physical layer and a data link layer in the PLC system bus 11.

The field network controller 140 (second communication circuit) controls the exchange of data via the field network 2. In other words, the field network controller 140 controls the transmission of the output data and the reception of the input data according to specifications of the field network 2 being used. As noted above, in the present embodiments, the field network 2 following the EtherCAT® standard is used. Therefore, the field network controller 140 is used that includes hardware for performing ordinary Ethernet® communication. In the EtherCAT® standard, a universal Ethernet® controller can be used in which a communication protocol obeying the ordinary Ethernet® standard is attained. However, depending on what kind of industrial Ethernet® is used as the field network 2, an Ethernet® controller is used which has particular specifications corresponding to a communication protocol having an exclusive-use specification different from the ordinary communication protocol. In addition, when a field network other than an industrial Ethernet® is used, an exclusive-use field network controller corresponding to the specification is used.

A second communication circuit buffer 146 acts as a transmission buffer of data output to another device via the field network 2 (hereafter referred to as either "output data" or "second output data") and as a reception buffer of data input from another device via the field network 2 (hereafter referred to as either "input data" or "second input data"). The second output data generated according to the calculation process by the microprocessor 100 is primitively stored in the main memory 104. Further, the second output data, which is to be transferred to a specific device, is retrieved from the main memory 104 and initially held in the second communication circuit buffer 146. The second input data, which is transferred from the other device, is moved to the main memory 104 after being initially held in the second communication circuit buffer 146.

A DMA control circuit 142 performs transfer of the second output data from the main memory 104 to the second communication circuit buffer 146 and transfer of the second input data from the second communication circuit buffer 146 to the main memory 104.

A field network communication control circuit 144 performs, between the other device connected to the field network 2, a process transmitting the second output data of the second communication circuit buffer 146 and a process receiving the second input data and storing the second input data in the second communication circuit buffer 146. Typically, the field network communication control circuit 144 provides a function of a physical layer and a data link layer in the field network 2.

The USB connector 110 is an interface for connecting the PLC support device 8 and the CPU unit 13. Typically, programs and the like transferred from the PLC support device 8 and executable by the microprocessor 100 of the CPU unit 13 are taken into the PLC 1 via the USB connector 110.

C. Software Configuration of CPU Unit

Figure 3:
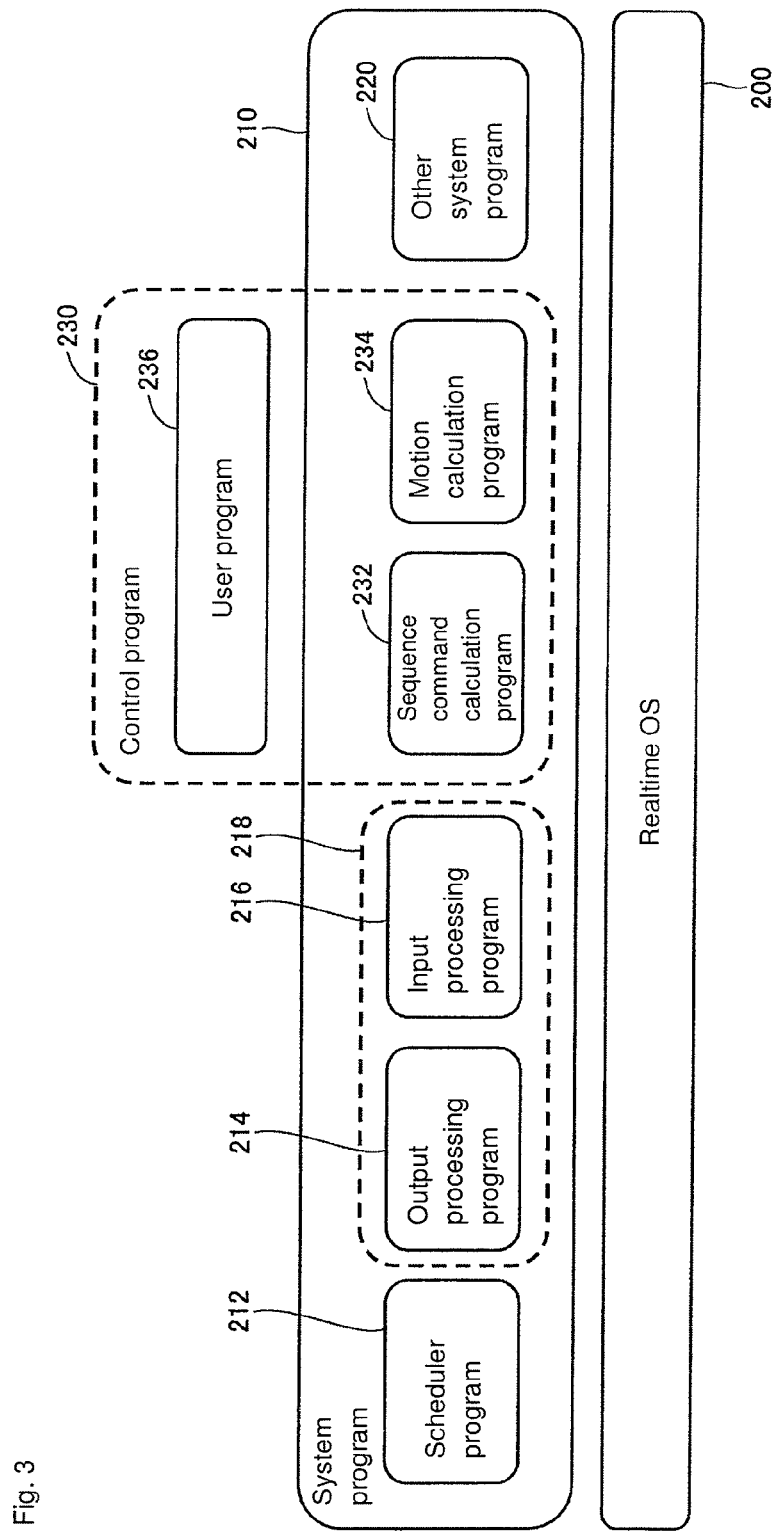
FIG. 3 is a schematic view illustrating a software configuration executed by the CPU unit according to the embodiments of the present invention.

Next, with reference to FIG. 3, a description is given of a software suite for providing various functions according to the present embodiments. A command included in the software is retrieved at an appropriate time and is executed by the microprocessor 100 of the CPU unit 13.

FIG. 3 is a schematic view illustrating a software configuration executed by the CPU unit 13 according to embodiments of the present invention. With reference to FIG. 3, the software executed by the CPU unit 13 has three layers: a real-time OS 200, a system program 210, and a user program 236.

The real-time OS 200 is designed according to the computer architecture of the CPU unit 13 and provides a basic executable environment for the microprocessor 100 to execute the system program 210 and the user program 236. The real-time OS is typically provided by the PLC manufacturer, a dedicated software company, or the like.

The system program 210 is a software suite for providing functions of the PLC 1. Specifically, the system program 210 includes a scheduler program 212, an output processing program 214, an input processing program 216, a sequence command calculation program 232, a motion calculation program 234, and other system programs 220. Moreover, in general, the output processing program 214 and the input processing program 216 are executed consecutively (as a unit), and thus these programs may be collectively referred to as an I/O processing program 218.

The user program 236 is generated according to a control objective of a user. In other words, the user program 236 is a program designed as desired in response to a line (process) or the like to be controlled using the PLC system SYS.

As noted below, the user program 236 works together with the sequence command calculation program 232 and the motion calculation program 234 to achieve the control objective of the user. In other words, the user program 236 utilizes a command, mathematical function, functional module, or the like provided by the sequence command calculation program 232 and the motion calculation program 234 in order to achieve a programmed operation. Therefore, the user program 236, sequence command calculation program 232, and motion calculation program 234 may be collectively referred to as a control program 230.

In this way, the microprocessor 100 of the CPU unit 13 executes the system program 210 and the control program 230 stored in the memory means.

Hereafter, each program is described in detail. As noted above, the user program 236 is generated according to the control objective of the user (e.g., a line or process to be controlled). Typically, the user program 236 is in an object program format that can be executed by the microprocessor 100 of the CPU unit 13. The user program 236 is generated in the PLC support device 8 or the like by compiling a source program written in a ladder language or the like. In addition, the generated user program 236 in the object program format is transferred from the PLC support device 8 to the CPU unit 13 via the connection cable 10, and is then stored in the non-volatile memory 106 or the like.

The scheduler program 212 controls process initiation in each execution cycle and process restart after the process is interrupted for the output processing program 214, the input processing program 216, and the control program 230. More specifically, the scheduler program 212 controls execution of the user program 236 and the motion calculation program 234.

In the CPU unit 13 according to the present embodiments, the constant-period execution cycle (control cycle) suitable for the motion calculation program 234 is used as a shared cycle of an entire process. Therefore, because all processes are unlikely to be completed within one control cycle, the processes to be executed are sorted according to a degree of priority into processes for which execution must be completed in each control cycle and processes which may be executed over a plurality of control cycles. The scheduler program 212 administrates an execution sequence and the like of the sorted processes. More specifically, the higher the degree of priority given the program, the sooner the scheduler program 212 executes the program within each control cycle duration.

The output processing program 214 reallocates the output data generated by execution of the user program 236 (the control program 230) in a format appropriate for transfer to the PLC system bus controller 120 and/or the field network controller 140. When the PLC system bus controller 120 or the field network controller 140 require an instruction from the microprocessor 100 for executing a transmission, the output processing program 214 issues the instruction.

The input processing program 216 reallocates the input data received by the PLC system bus controller 120 and/or the field network controller 140 in a format appropriate for use by the control program 230.

The sequence command calculation program 232 is a program called up when a given sequence command used by the user program 236 is executed. The sequence command calculation program 232 is executed to attain the content of the command.

The motion calculation program 234 is a program executed according to an instruction by the user program 236 and calculates an instruction value output to a motor driver such as the servo motor driver 3 or the pulse motor driver each time the program is executed.

The other system programs 220 collectively refer to a suite of programs for achieving various functions of the PLC 1 other than those of the programs individually depicted in FIG. 3.

The real-time OS 200 provides an environment for switching between and executing the plurality of programs according to passage of time. In the PLC 1 according to the present embodiments, the output data generated by execution of the programs of the CPU unit 13 is treated as an event (interrupt) for output (transmission) to another unit or another device, and the interrupt of the control cycle initiation is given as a default setting. When the interrupt of the control cycle initiation is generated, the real-time OS 200 switches an execution target in the microprocessor 100 from the program being executed at the time the interrupt is generated to the scheduler program 212. Moreover, when the scheduler program 212 and the program whose execution is controlled by the scheduler program 212 are never executed, the real-time OS 200 executes a program included in another system program 210. Such a program includes, for example, a program related to communication processing via the connection cable 10 (USB) between the CPU unit 13 and the PLC support device 8.

Moreover, the control program 230 and the scheduler program 212 are stored in the main memory 104 and the non-volatile memory 106, which are memory means.

D. Main Memory Configuration

Figure 4:
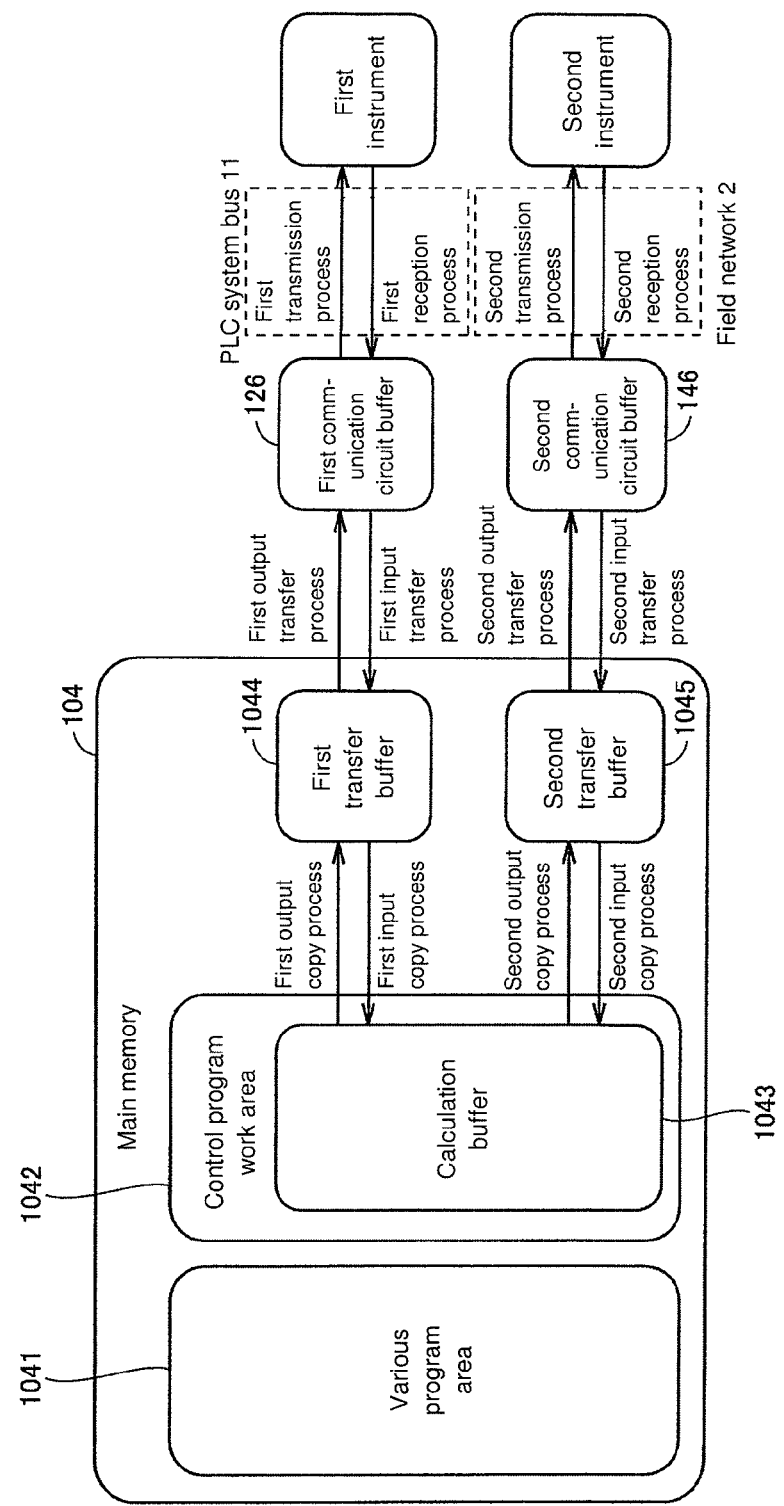
FIG. 4 is a schematic view illustrating a configuration of the main memory area of the CPU unit according to the embodiments of the present invention.

Next, with reference to FIG. 4, a description is given of a storage area configured by the main memory 104 of the CPU unit 13.

FIG. 4 is a schematic view illustrating a configuration of the main memory 104 area of the CPU unit 13 according to embodiments of the present invention. With reference to FIG. 4, the main memory 104 forms a various programs area 1041, a control program work area 1042, a first transfer buffer 1044, and a second transfer buffer 1045. The control program work area 1042 includes a calculation buffer 1043. The CPU unit 13 generates these areas by executing a command included in the system program 210 at start-up or the like.

Code for executing various programs is temporarily stored in the various programs area 1041. The output data created by execution of the control program 230 is temporarily stored in the control program work area 1042.

The input data is read from the calculation buffer 1043 accompanying execution of the control program and the output data is written to the calculation buffer 1043.

The first transfer buffer 1044 stores the output data transmitted by the PLC system bus 11 and the input data received by the PLC system bus 11. The second transfer buffer 1045 stores the output data transmitted by the field network 2 and the input data received by the field network 2.

When any output data must be transmitted through the PLC system bus 11, the microprocessor 100 copies the output data to be transmitted from the control program work area 1042 to the first transfer buffer 1044. This copying process is also called a "first output copy process" hereafter. At this point, the microprocessor 100 reallocates the output data such that an output data group intended for the same unit is grouped in the first transfer buffer 1044 so that a plurality of output data transmitted to the same unit can be transmitted together.

The output data copied to the first transfer buffer 1044 is transferred to the first communication circuit buffer 126 of the PLC system bus controller 120. A process of transferring the output data from the first transfer buffer 1044 to the first communication circuit buffer 126 is controlled by the DMA control circuit 122 of the PLC system bus controller 120. This transfer process is also called a "first output transfer process" hereafter. Moreover, the PLC system bus communication control circuit 124 of the PLC system bus controller 120 transmits the output data transferred to the first communication circuit buffer 126 to the transmission destination (first instrument) through the PLC system bus 11. This transmission process is also called a "first transmission process" hereafter.

Similarly, when any output data must be transmitted through the field network 2, the microprocessor 100 copies the output data to be transmitted from the control program work area 1042 to the second transfer buffer 1045. This copying process is also called a "second output copy process" hereafter. At this point, the microprocessor 100 reallocates the output data to the second transfer buffer 1045 in a format that can be transmitted as serial frames.

The output data copied to the second transfer buffer 1045 is transferred to the second communication circuit buffer 146 of the field network controller 140. A process of transferring the output data from the second transfer buffer 1045 to the second communication circuit buffer 146 is controlled by the DMA control circuit 142 of the field network controller 140. This transfer process is also called a "second output transfer process" hereafter. Moreover, the field network communication control circuit 144 of the field network controller 140 transmits the output data transferred to the second communication circuit buffer 146 to the transmission destination (second instrument) through the field network 2. This transmission process is also called a "second transmission process" hereafter.

Meanwhile, the input data transmitted from the transmission destination (first instrument) through the PLC system bus 11 is received by the PLC system bus communication control circuit 124 of the PLC system bus controller 120 and is then stored in the first communication circuit buffer 126. This process of receiving the input data from the transmission destination (first instrument) is also called a "first reception process" hereafter. The input data stored in the first communication circuit buffer 126 is transferred to the first transfer buffer 1044. This process of transferring the input data from the first communication circuit buffer 126 to the first transfer buffer 1044 is controlled by the DMA control circuit 122 of the PLC system bus controller 120. This transfer process is also called a "first input transfer process" hereafter.

Moreover, the microprocessor 100 copies the input data transferred to the first transfer buffer 1044 to the calculation buffer 1043. This copying process is also called a "first input copy process" hereafter. At this point, the microprocessor 100 reallocates the copied input data to the calculation buffer 1043 in a format appropriate for use by the control program 230.

Similarly, the input data transmitted from the transmission destination (second instrument) through the field network 2 is received by the field network communication control circuit 144 of the field network controller 140 and is then stored in the second communication circuit buffer 146. This process of receiving the input data from the transmission destination (second instrument) is also called a "second reception process" hereafter. The input data received in the second communication circuit buffer 146 is transferred to the second transfer buffer 1045. This process of transferring the input data from the second communication circuit buffer 146 to the second transfer buffer 1045 is controlled by the DMA control circuit 142 of the field network controller 140. This transfer process is also called a "second input transfer process" hereafter.

Moreover, the microprocessor 100 copies the input data transferred to the second transfer buffer 1045 to the calculation buffer 1043. This copying process is also called a "second input copy process" hereafter. At this point, the microprocessor 100 reallocates the copied input data to the calculation buffer 1043 in a format appropriate for use by the control program 230.

In this way, the microprocessor 100 controls execution of the output copy processes (the first output copy process and the second output copy process) and the input copy processes (the first input copy process and the second input copy process), the output copy processes copying the output data from the calculation buffer 1043 to the first transfer buffer 1044 and the second transfer buffer 1045, the input copy processes copying the input data from the first transfer buffer 1044 and the second transfer buffer 1045 to the calculation buffer 1043.

The output copy processes (the first output copy process and the second output copy process) are achieved by the microprocessor 100 executing the output processing program 214, and the input copy processes (the first input copy process and the second input copy process) are achieved by the microprocessor 100 executing the input processing program 216.

In the CPU unit 13 according to the present embodiments, the calculation buffer 1043, the first transfer buffer 1044, and the second transfer buffer 1045 are configured so as to be capable of controlling access to each in a mutually independent manner. Therefore, a plurality of operations can be executed in parallel, such as (1)-(3) below, for example.

(1) Access to the calculation buffer 1043 performed by the microprocessor 100 and accompanying execution of the control program 230

(2) Access to the first transfer buffer 1044 in the main memory 104 performed by the DMA control circuit 122 of the PLC system bus controller 120 in order to transfer data between the first transfer buffer 1044 and the first communication circuit buffer 126

(3) Access to the second transfer buffer 1045 in the main memory 104 performed by the DMA control circuit 142 of the field network controller 140 in order to transfer data between the second transfer buffer 1045 and the second communication circuit buffer 146

Therefore, the microprocessor 100 controls at least one of the first communication circuit (PLC system bus controller 120) and the second communication circuit (field network controller 140) so as to execute in parallel the first input/output process and the second input/output process. The first input/output process includes the process outputting the output data from the first transfer buffer 1044, through the first transmission circuit (PLC system bus controller 120), to the first instrument in the PLC system bus 11 (output process) and the process inputting the input data from the first instrument, through the first communication circuit, to the first transfer buffer 1044 (input process). The second input/output process includes the process outputting the output data from the second transfer buffer 1045, through the second communication circuit (field network controller 140), to the second instrument in the field network 2 (output process) and the process inputting the input data from the second instrument, through the second communication circuit, to the second transfer buffer 1045 (input process).

Herein, the first input/output process includes the first output transfer process transferring the output data from the first transfer buffer 1044 to the first communication circuit buffer 126; the first transmission process transmitting the output data from the first communication circuit buffer 126 to the first instrument; the first reception process receiving the input data from the first instrument to the first communication circuit buffer 126; and the first input transfer process transferring the input data from the first communication circuit buffer 126 to the first transfer buffer 1044. Similarly, the second input/output process includes the second output transfer process transferring the output data from the second transfer buffer 1045 to the second communication circuit buffer 146; the second transmission process transmitting the output data from the second communication circuit buffer 146 to the second instrument; the second reception process receiving the input data from the second instrument to the second communication circuit buffer 146; and the second input transfer process transferring the input data from the second communication circuit buffer 146 to the second transfer buffer 1045.

A description of each of the above-noted buffers is given here.

The calculation buffer is generated in the main memory 104 of the CPU unit 13 for each input data and each output data. Therefore, when there are a plurality of control programs, the calculation buffer for one input data or one output data is generated for each control program.

There may be a plurality of calculation buffers for one input data or one output data for one control program. For example, when two calculation buffers each are generated for one input data or one output data for one control program, and one of the calculation buffers is used for execution of the control program, copying of the data from the first transfer buffer 1044 or the second transfer buffer 1045 may be performed by the other of the calculation buffers. In this way, the plurality of calculation buffers operated to create groups for identical input data or output data can be viewed collectively as a single calculation buffer.

FIG. 4 collectively illustrates numerous calculation buffers for numerous input data and output data as the calculation buffer 1043. In other words, the calculation buffer 1043 may be viewed as indicating a calculation buffer area. Similarly, numerous buffers for numerous input data and output data are collectively illustrated in FIG. 4 for the first transfer buffer 1044, the second transfer buffer 1045, the first communication circuit buffer 126, and the second communication circuit buffer 146.

E. Overall Processing Operation of System Program

Next, a description is given of overall processing operations of the system program 210.

The system program 210 includes an execution preparation command of a control operation and an execution control command of a control operation. The execution preparation command and the execution control command include the following commands. The microprocessor 100 executes these commands in response to predetermined timing or generation of an event such as the interrupt.

(1) Execution Preparation Command

A command generating, in the main memory 104, the calculation buffer 1043 in which, accompanying execution of the control program, the input data is read and the output data is written; the first transfer buffer 1044 storing the output data transmitted by the PLC system bus 11 and the input data received by the PLC system bus 11; and the second transfer buffer 1045 storing the output data transmitted by the field network 2 and the input data received by the field network 2.

(2) Execution Control Command (a) Control program initiation command initiating execution of the control program 230.

(b) First output copy command for copying the output data from the calculation buffer 1043 to the first transfer buffer 1044.

(c) Second output copy command for copying the output data from the calculation buffer 1043 to the second transfer buffer 1045.

(d) First input copy command for copying the input data from the first transfer buffer 1044 to the calculation buffer 1043.

(e) Second input copy command for copying the input data from the second transfer buffer 1045 to the calculation buffer 1043.

(f) Input/output control command which is an input/output control command of at least one of a first input/output control command for controlling the first communication circuit (PLC system bus controller 120) and a second input/output control command for controlling the second communication circuit (field network controller 140), and which enables execution in parallel of the first input/output process and the second input/output process, the first input/output process including the process outputting the output data from the first transfer buffer 1044, through the first transmission circuit, to the first instrument in the PLC system bus 11 and the process inputting the input data from the first instrument, through the first communication circuit, to the first transfer buffer 1044, the second input/output process including the process outputting the output data from the second transfer buffer 1045, through the second communication circuit, to the second instrument in the field network 2 and the process inputting the input data from the second instrument, through the second communication circuit, to the second transfer buffer 1045.

These commands are executed by the microprocessor 100 according to a protocol noted below.

Figure 5:
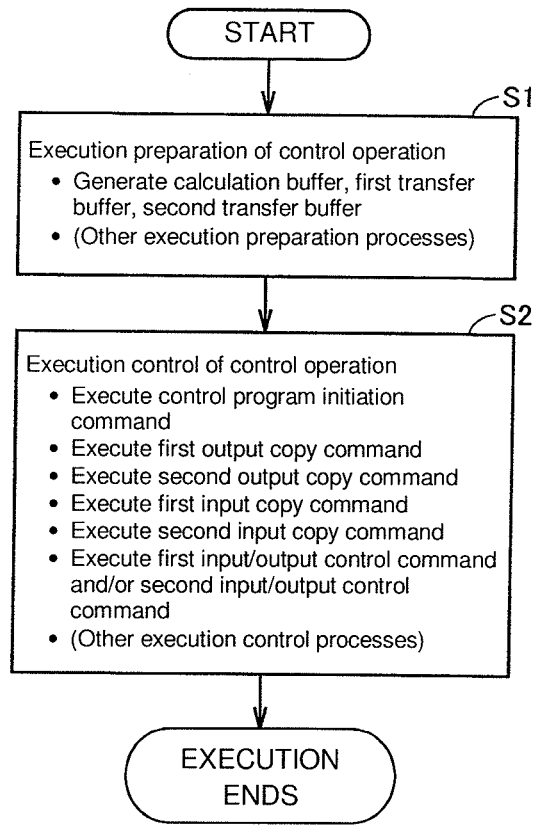
FIG. 5 is a flow chart illustrating an overall process of a system program in the CPU unit according to the embodiments of the present invention.

FIG. 5 is a flow chart illustrating an overall process of the system program in the CPU unit according to the embodiments of the present invention. First, as shown in FIG. 5, an execution preparation process of a control operation is executed (step S1). More specifically, in step S1, the microprocessor 100 executes the execution preparation command, generating the calculation buffer 1043, the first transfer buffer 1044, and the second transfer buffer 1045 in the main memory 104. Moreover, the execution preparation process of the control program 230 may include other execution preparation processes appropriate for a specific embodiment.

Next, an execution control process of a control operation is executed (step S2). The execution control process is executed repeatedly. More specifically, in step S2, the microprocessor 100 executes the control program initiation command, the first output copy command, the second output copy command, the first input copy command, the second input copy command, and the input/output control command (the first input/output process and/or the second input/output process executed in parallel). Further, the execution control process of the control operation may include other execution control processes appropriate for a specific embodiment. A sequence of execution for each process included in the execution control process of the control operation depends on the specific embodiment.

F. Regarding Parallel Processing in CPU Unit

As noted above, in the CPU unit 13 according to the present embodiments, the first input/output process and the second input/output process can be executed in parallel. In addition, in the CPU unit 13 (microprocessor 100), the control program 230 is also executed. Thus, an overview description is first given for parallel processing in the CPU unit 13 with reference to FIGS. 6 to 9. FIGS. 6 to 9 are sequence diagrams of operations of the CPU unit 13 according to the embodiments of the present invention.

Before describing each of the sequence diagrams, a description is given regarding reference symbols in the drawings.

The reference symbol "T" in the drawings indicates timing of the constant-period interrupt (control cycle initiation interrupt) generated by the system timer. The control cycle is initiated by the generation of the control cycle initiation interrupt T. In the example shown in FIGS. 6 to 9, the execution cycle of the control program is equal to the control cycle.

A signal input from outside the CPU unit 13 and having a constant period or a non-constant period may be used as the control cycle initiation interrupt T. In such a case, the control operation can be performed synchronized with some event in an exterior, which is treated as a signal source.

When all processes within one control cycle are completed, processes of the next control cycle may be initiated immediately without use of the control cycle initiation interrupt. In such a case, an amount of time for the control cycle may fluctuate with each control cycle. In order to void the influence of such fluctuation, after all processes related to control operation within one control cycle are completed, a system program may be executed to stall processes until a fixed amount of time passes from initiation of the control cycle, thereby making periods of the control cycles substantially constant.

Next, the reference symbols "A" to "G" in the drawings indicate timing for initiation or conclusion of each process, as shown below.

A: Output transfer process initiation time (also indicates output process initiation time and input/output process initiation time)

B: Transmission process initiation time (also indicates transmission process and reception process initiation time)

C: Transmission process conclusion time (also indicates output process conclusion time)

D: Reception process initiation time (also indicates input process initiation time)

E: Reception process conclusion time (also indicates transmission process and reception process conclusion time)

F: Input transfer process initiation time

G: Input transfer process conclusion time (also indicates input process conclusion time and input/output process conclusion time)

In addition, numerals "1" and "2" appended to the reference symbols "A" to "G" indicate that each is related to the first input/output process or the second input/output process, respectively.

Moreover, in the sequence diagram of FIG. 6, which will be described first, only the reference symbols A1, A2, G1, and G2 appear. Also, all the reference symbols appear in the sequence diagram of FIG. 16, which is described later.

Herein, when any of the above-noted times A to G is denoted with a letter "X," generally X1 and X2 are not the same time. This is because a slight time difference arises for the processes of the "first" system (i.e., those related to the PLC system bus 11) and the processes of the "second" system (i.e., those related to the field network 2) because, when respective instructions to initiate the processes are issued using a command of the system program 210, the command itself is executed in sequence, even when attempting to initiate the processes simultaneously. Further, the processes of the "first" system and the processes of the "second" system each have different procedural content at an implementation level, and thus the conclusion times of each differ.

Figure 6:
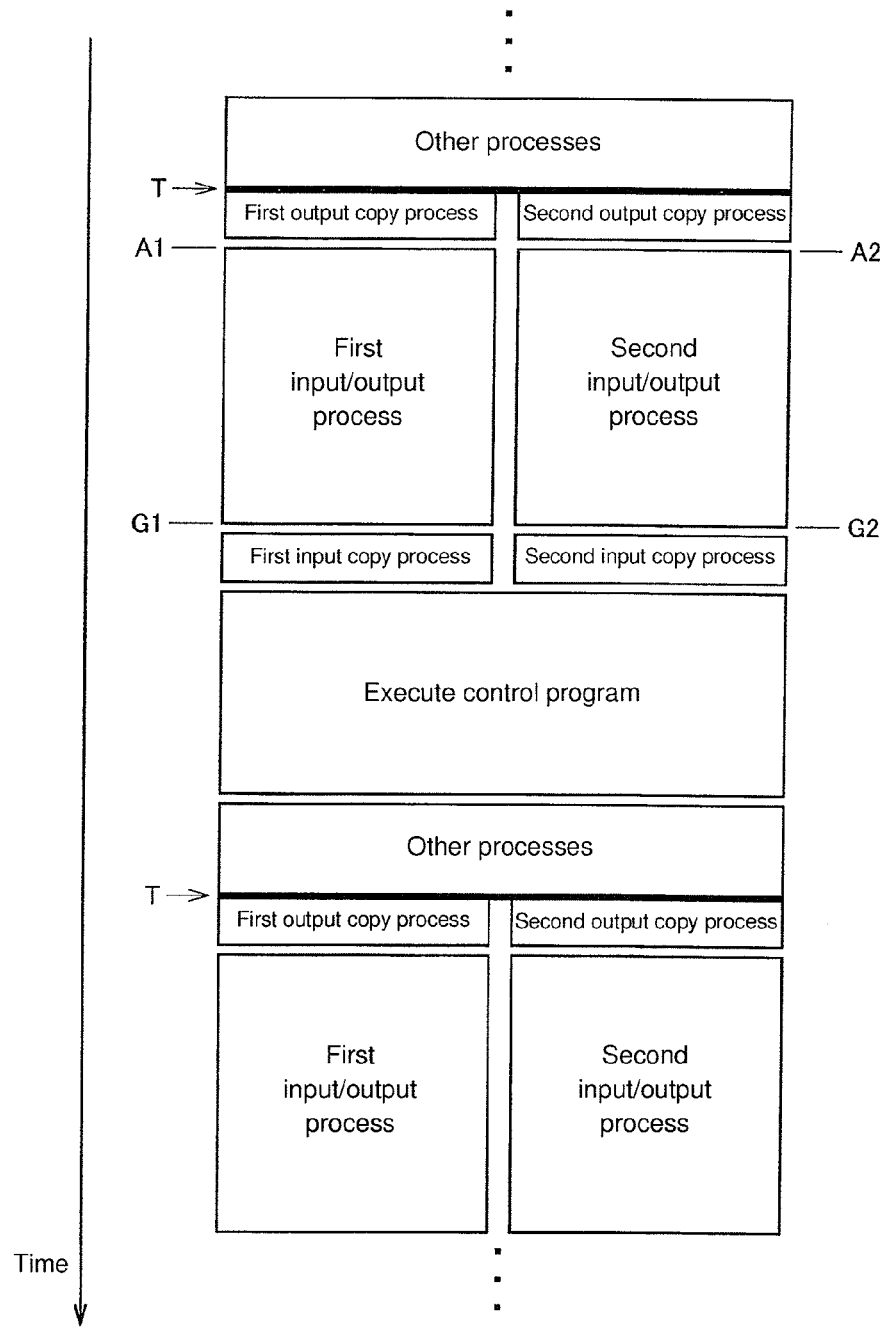
FIG. 6 is a sequence diagram of operations of the CPU unit according to the embodiments of the present invention.

Moreover, as in the "output copy process"—"input/output process"—"input copy process" shown in the sequence diagram of FIG. 6, within each sequence of the "first" system and "second" system, respectively, in a case where a format is used that waits for the conclusion of a prior process and then initiates a subsequent process, the initiation time of the subsequent process depends on the conclusion time of the prior process. For this reason also, the initiation time of corresponding processes in the "first" system and the "second" system differ from each other.

When the microprocessor 100 itself performs the output copy process and the input copy process as program processes, the output copy processes and input copy processes of the "first" system and "second" system are not executed in parallel but in fact are executed sequentially. Parallel execution of the processes is possible when the output copy processes and input copy processes of the "first" system and "second" system can be executed independently of each other by a DMA control circuit installed in the chip set or by a separately provided DMA control circuit, or alternatively by a multi-core microprocessor. Even when the microprocessor itself does not perform the output copy process and the input copy process as program processes, the microprocessor controls execution of the processes at least by assigning a trigger to initiate execution.

FIG. 6 depicts an exemplary sequence in a case where the input/output process is performed continuously within one control cycle. When the control cycle initiation interrupt T is generated, first a process related to input/output is executed, after which the control program is executed. In the following description, the simple term "input/output process" includes within the process a case where the input process is performed after the output process, a case where the output process is performed after the input process, and a case where the output process and the input process are performed mixed together without having separate time slots.

Performing the input/output process in parallel means that, after initiation of the first input/output process (initiation time A1), initiation of the second input/output process (initiation time A2) occurs before conclusion of the first input/output process (conclusion time G1), or means the opposite: that after initiation of the second input/output process (initiation time A2), initiation of the first input/output process (A1) occurs before conclusion of the second input/output process (conclusion time G2). In the following description, regardless of the procedural content, when similar types of processes are performed in parallel in the "first" system and the "second" system, the meaning is similar to the above.

Figure 7:
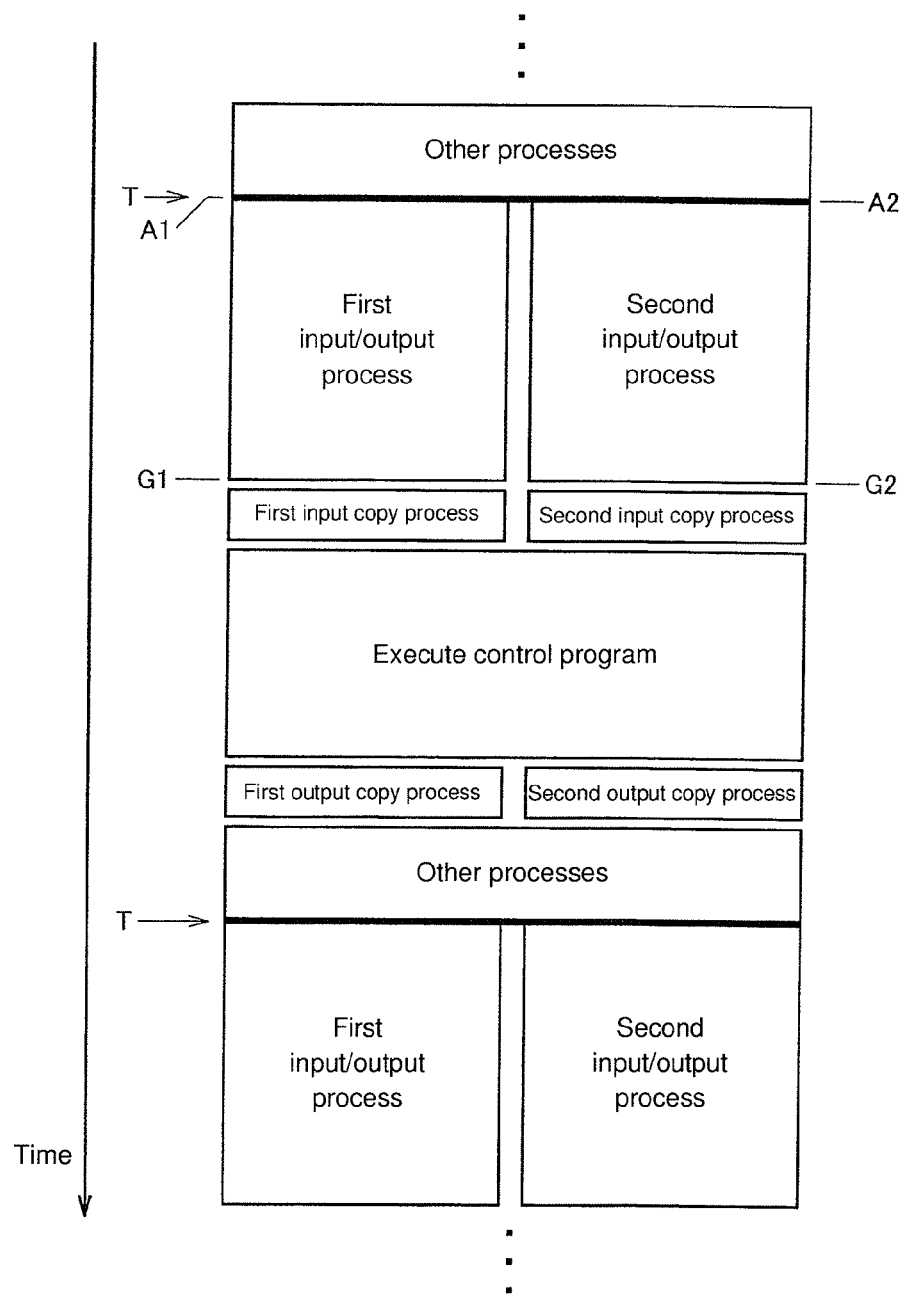
FIG. 7 is a sequence diagram of operations of the CPU unit according to the embodiments of the present invention.
Figure 8:
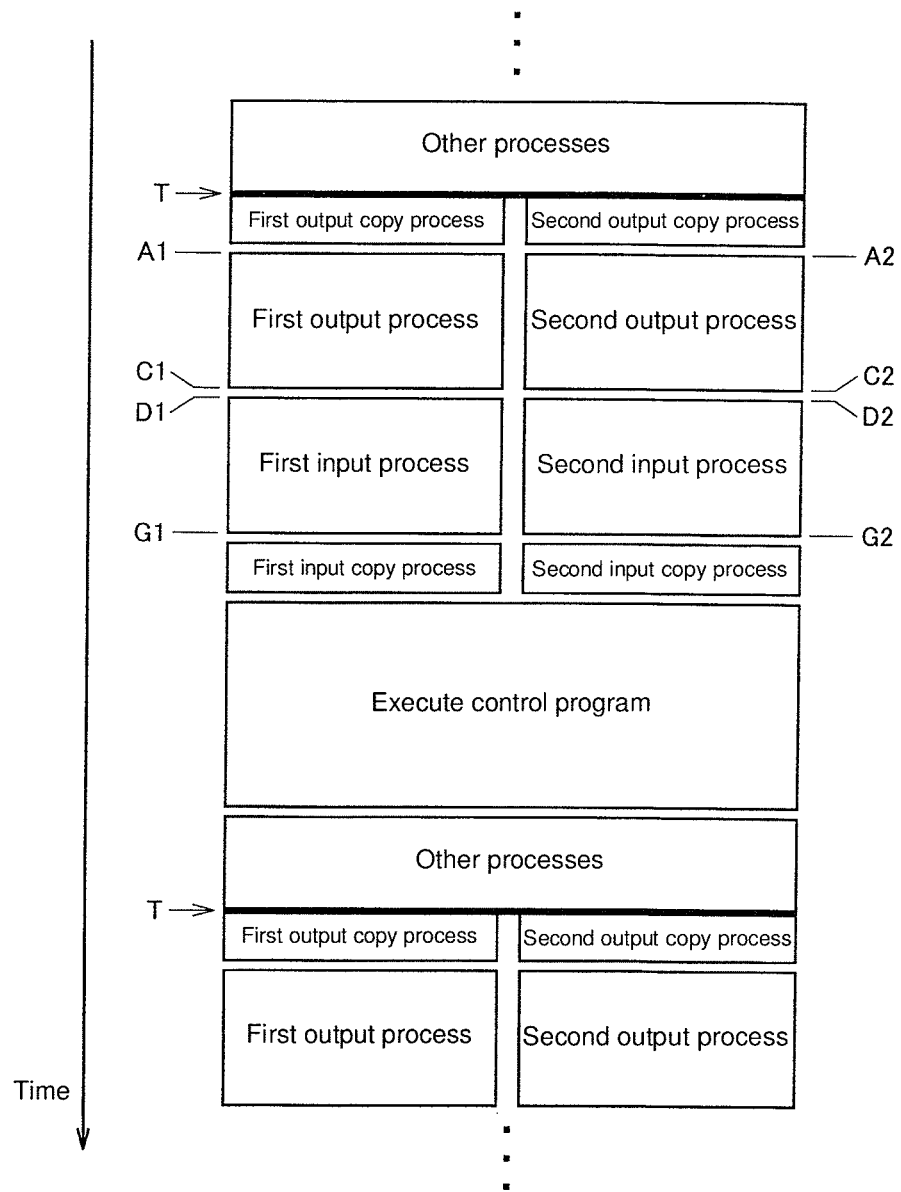
FIG. 8 is a sequence diagram of operations of the CPU unit according to the embodiments of the present invention.
Figure 9:
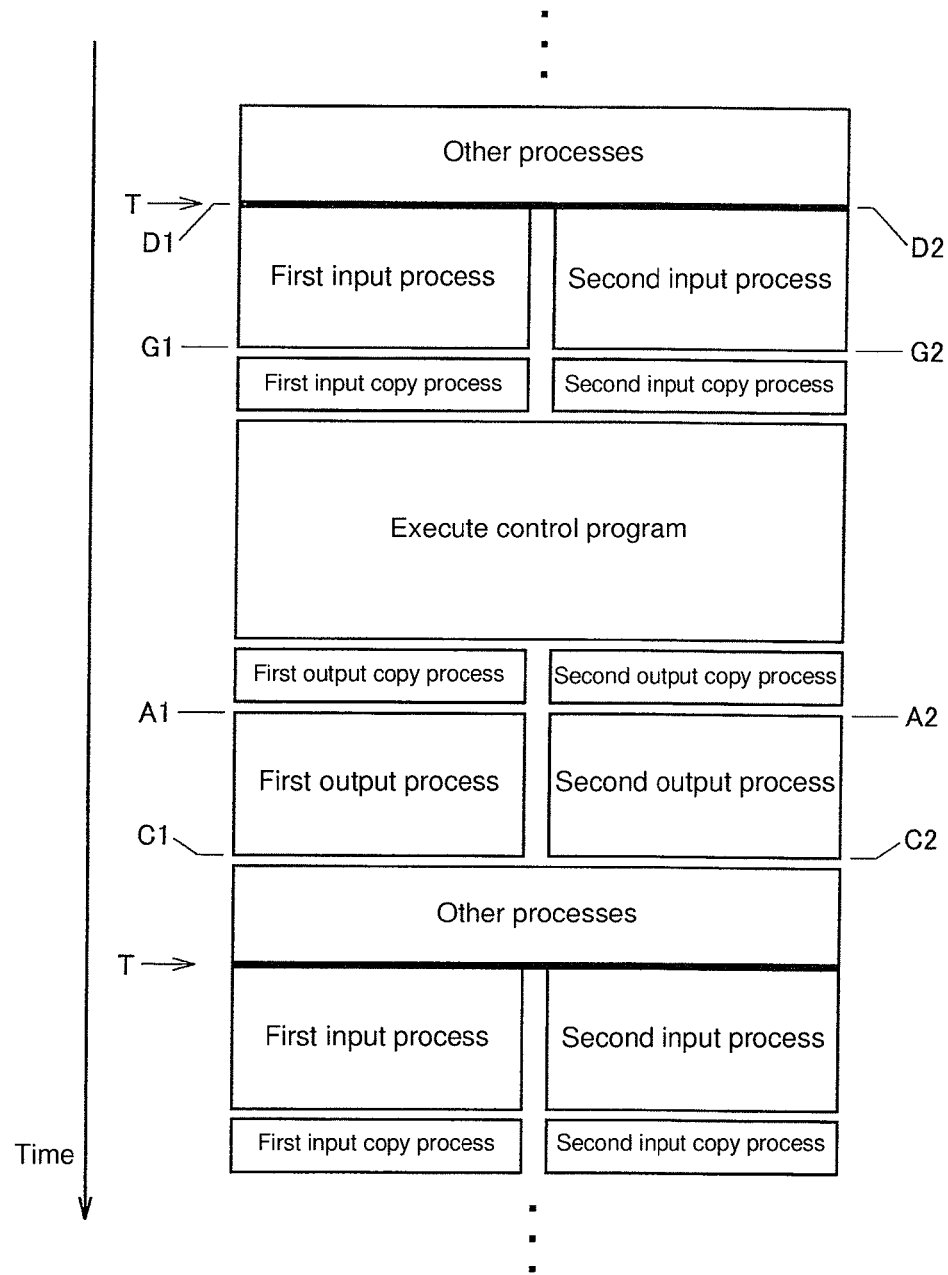
FIG. 9 is a sequence diagram of operations of the CPU unit according to the embodiments of the present invention.

FIGS. 7 to 9 illustrate various aspects for parallel execution of the input/output process.

Figure 18:
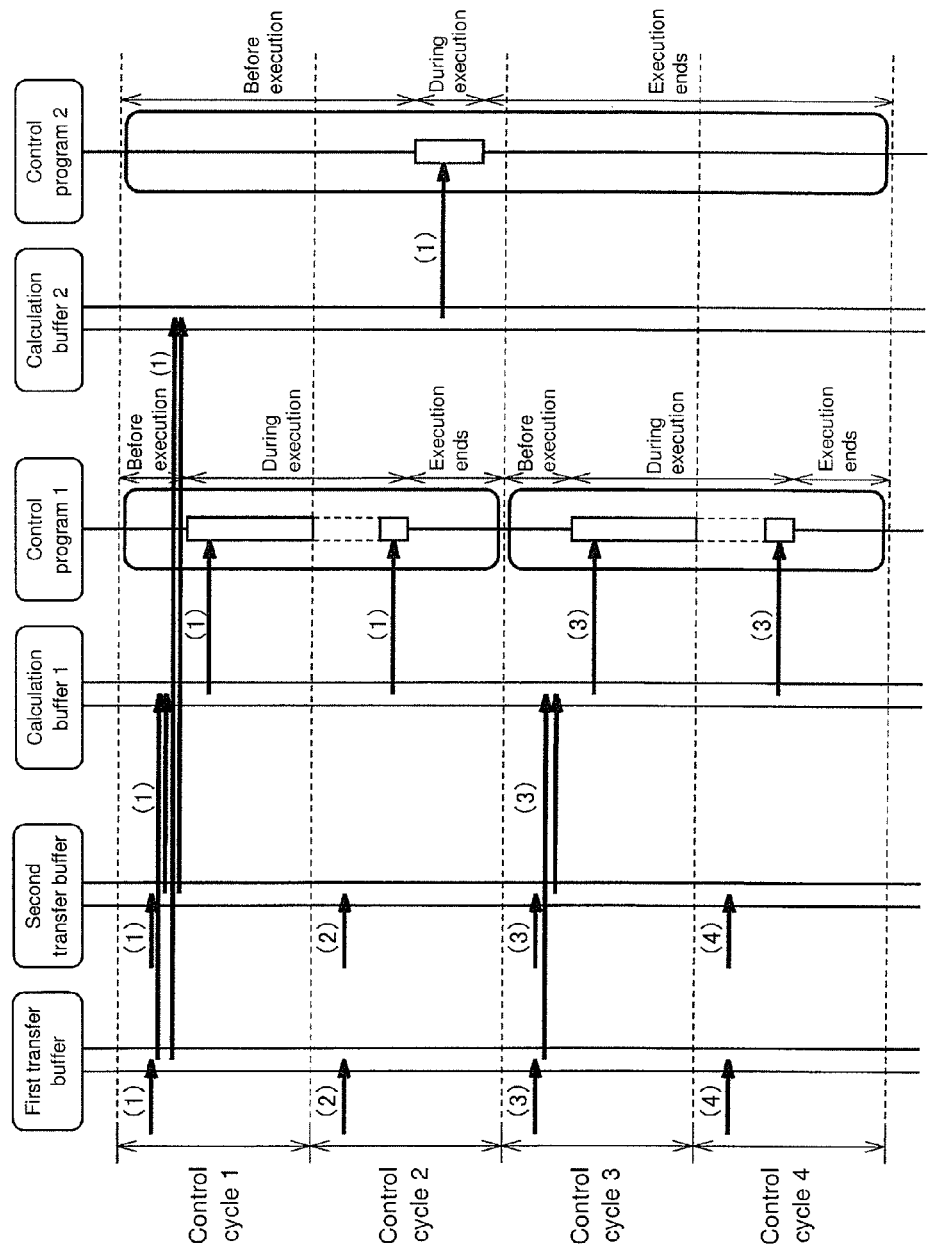
FIG. 18 is a sequence diagram of operations (input direction) of the CPU unit according to Embodiment 5 of the present invention.
Figure 19:
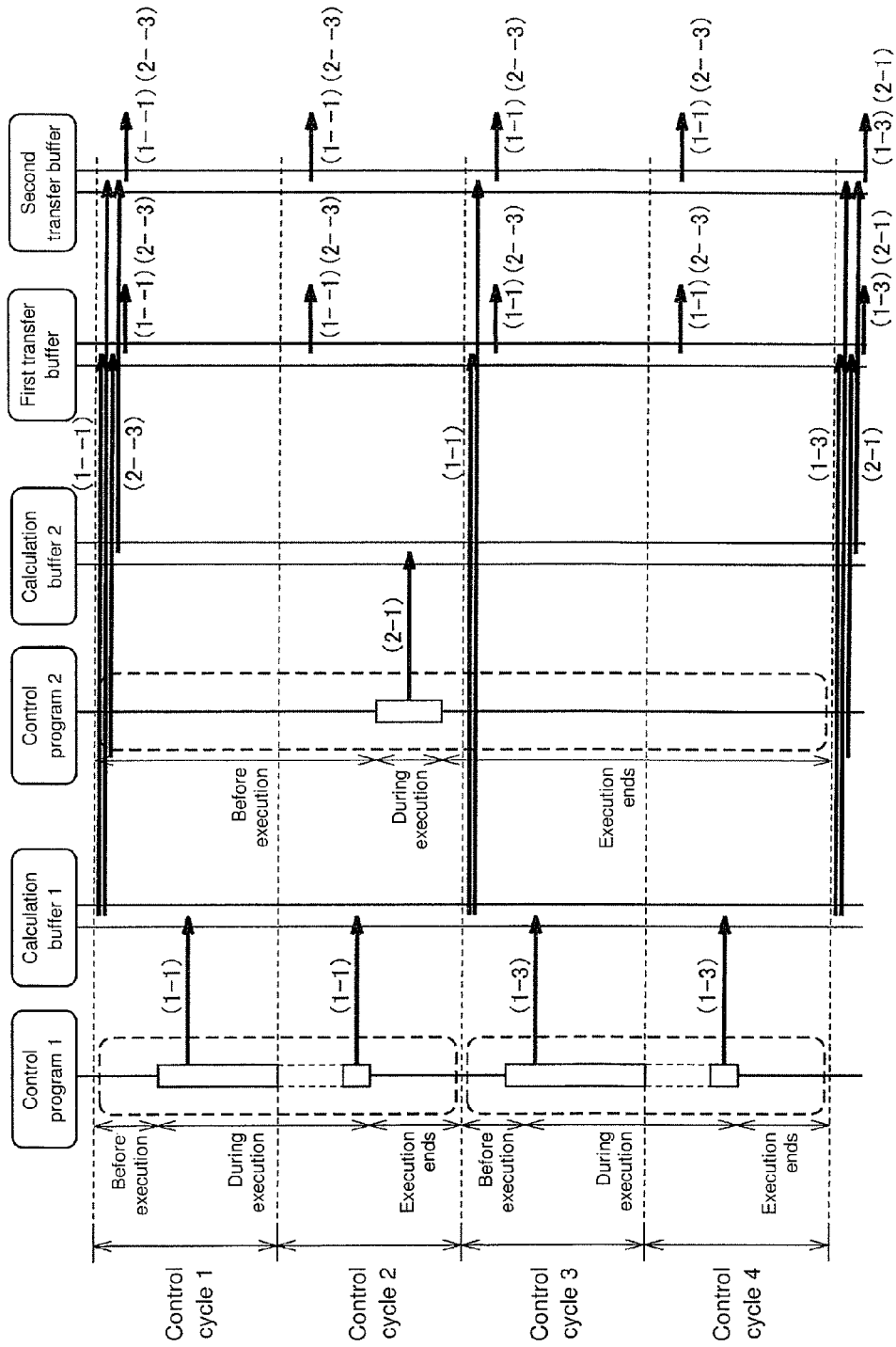
FIG. 19 is a sequence diagram of operations (output direction) of the CPU unit according to Embodiment 5 of the present invention.

FIG. 7 also depicts an exemplary sequence in a case where the input/output process is performed continuously within one control cycle. Unlike the case of FIG. 6, the output copy process is performed immediately after execution of the control program. In other words, the output copy process is not limited to being performed immediately before the input/output process. In a case where one control program is executed for each control cycle, in either one of the sequences shown in FIGS. 6 and 7, operations of the CPU unit 13 as viewed from the exterior are largely unchanged. However, as shown in FIGS. 18 and 19 (described later), in a case where an execution period of the control program is longer than the period of the control cycle (period of transmission/reception), when the output data generated by the execution of a specific control program is output from the CPU unit 13 may begin to differ depending on whether the output copy process is performed immediately before the input/output process, as shown in FIG. 6, or immediately after execution of the control program, as shown in FIG. 7.

In addition, in a case where the execution period of the control program is longer than the period of the control cycle, a process related to a different control program may be performed between the input/output process and execution of the control program. In such a case, the input copy process may be performed immediately after the input/output process, or may be performed immediately before execution of the control program. Depending on which order the input copy process is performed in, during execution of the specific control program, when the input data input is used may begin to differ.

FIG. 8 depicts an exemplary sequence in a case where the input/output process shown in FIG. 6 is divided into the output process and the input process to be executed. FIG. 9 depicts an exemplary sequence in a case where the input process is performed before execution of the control program and the output process is performed after execution of the control program within one control cycle.

In either one of the sequences shown in FIGS. 8 and 9, the first input/output process includes the first output process, in which the output data is output from the first transfer buffer to the first instrument, and the first input process, in which the input data is input from the first instrument to the first transfer buffer. Similarly, the second input/output process includes the second output process, in which the output data is output from the second transfer buffer to the second instrument, and the second input process, in which the input data is input from the second instrument to the second transfer buffer. Also, the microprocessor 100 performs control such that at least one of parallel execution of the first output process and the second output process and parallel execution of the first input process and the second input process is performed.

In this way, by dividing the input/output process into the output process and the input process to be performed, the output command and the input command can be used jointly even when employing one of the sequence shown in FIG. 8, where the input/output process is performed as a serial process, and the sequence as shown in FIG. 9, where the input process and the output process are divided to be performed with execution of the control program therebetween.

Hereafter, a description is given regarding a more concrete embodiment based on the configuration shown in FIGS. 2 and 4. Moreover, in the following description, in cases where a "first" and a "second" of similar processes or commands exist, when the process or command is not specified as the "first" or "second," the description is common to both the "first" and "second."

G. Overall Process Operation

Embodiment 1

A concrete embodiment of the input/output process of the sequence shown in FIG. 6 is described as Embodiment 1. An example of the case where the input/output process is performed integrally is illustrated in Embodiment 1.

Figure 10:
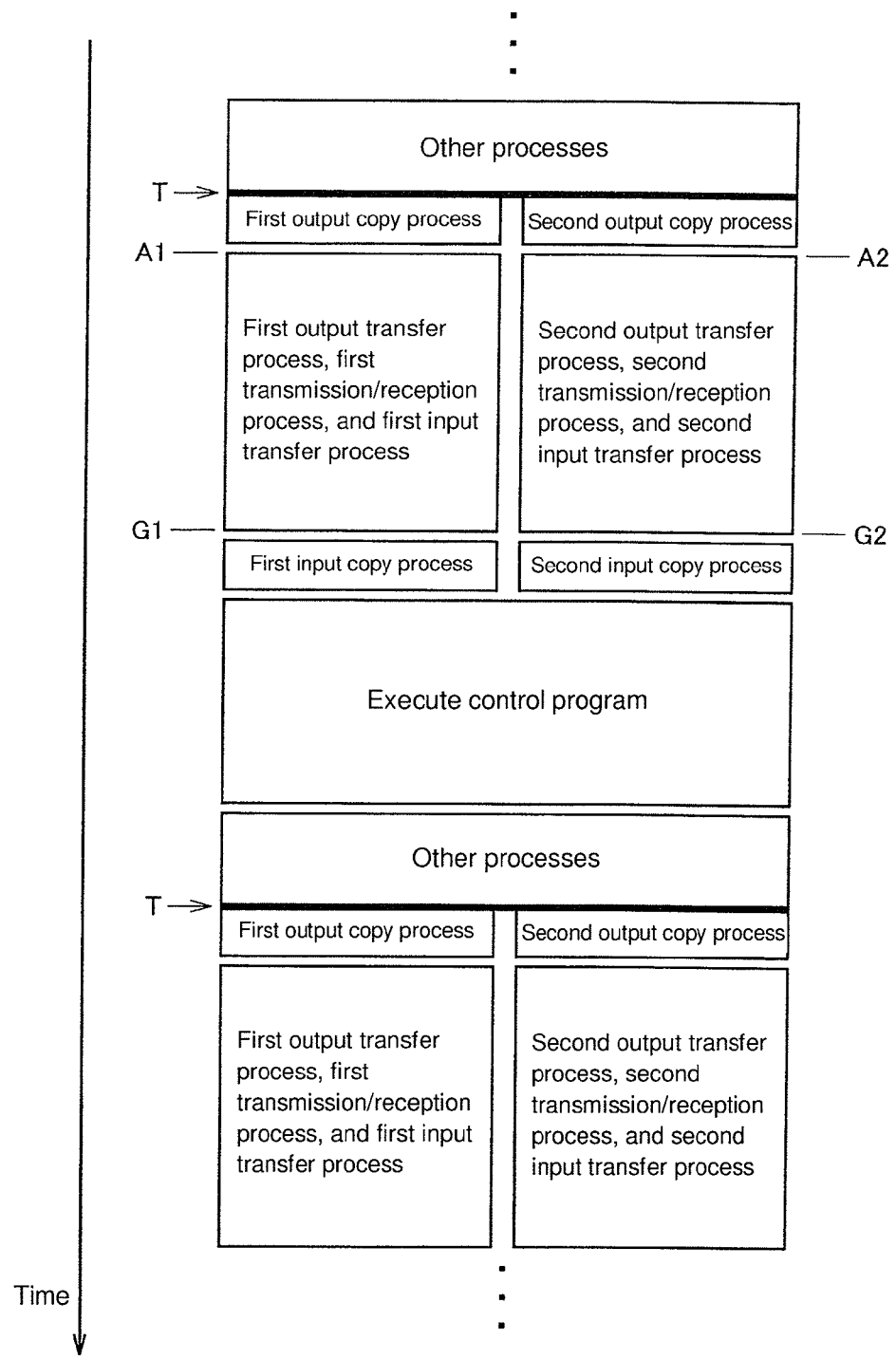
FIG. 10 is a sequence diagram of operations of the CPU unit according to Embodiment 1 of the present invention.
Figure 11:
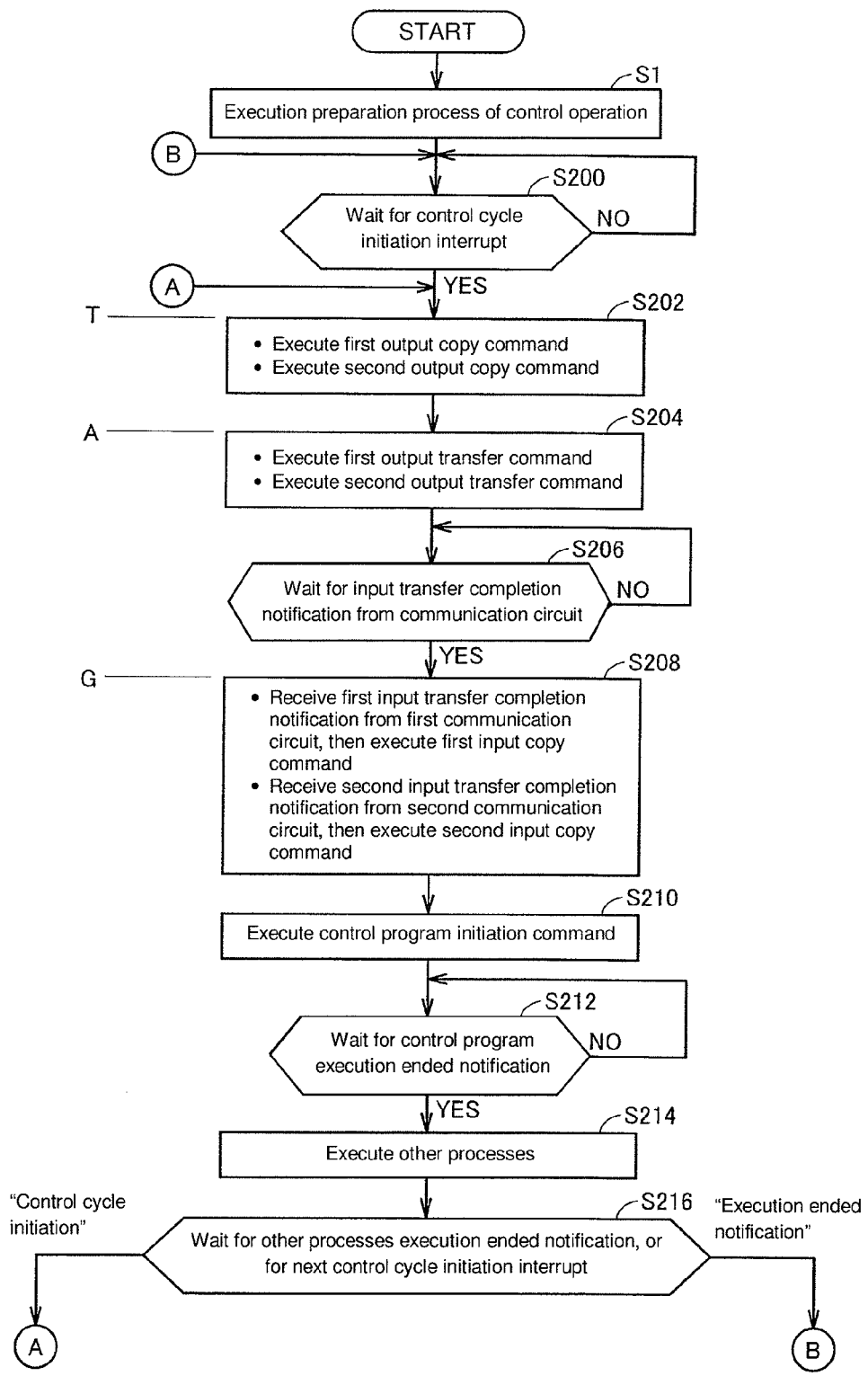
FIG. 11 is a flow chart corresponding to the sequence diagram shown in FIG. 10.

FIG. 10 is a sequence diagram of operations of the CPU unit 13 according to Embodiment 1 of the present invention. FIG. 11 is a flow chart corresponding to the sequence diagram shown in FIG. 10.

With reference to FIG. 10, the input/output process in the sequence shown in FIG. 6 is configured, more specifically, by the output transfer process, the transmission/reception process, and the input transfer process.

As described with reference to FIG. 4, in the CPU unit 13 according to the present embodiment, by executing the output copy command and the input copy command, the microprocessor 100 itself performs copying of the output data and the input data, respectively, between the calculation buffer 1043 and the transfer buffers 1044 and 1045.

In addition, by executing the output transfer command, which is at least a portion of the input/output control command, the microprocessor 100 gives an instruction to the communication circuit (the PLC system bus controller 120 and the field network controller 140) to initiate output transfer. When the communication circuit receives this instruction, the DMA control circuit (DMA control circuits 122 and 142) within the communication circuit transfers (copies) the output data from the transfer buffers 1044 and 1045 to the communication circuit buffers 126 and 146. When the transfer is complete, the communication control circuit (PLC system bus communication control circuit 124 and field network communication control circuit 144) within the communication circuit performs the transmission/reception processes between the respective instruments. In other words, the communication control circuit transmits the output data from the communication circuit buffers 126 and 146 to the instruments, and receives the input data from the instruments to the communication circuit buffers 126 and 146.

The transmission/reception process is preferably performed in an aspect efficient for a communication standard, depending on the communication standard of the PLC system bus 11 and the field network 2 being used. For example, in the case of EtherCAT®, a master instrument stores output data sent to various slave instruments in one serial frame and transmits the output data. Meanwhile, while directed through the frame, each slave instrument reads the output data intended for itself from the frame and writes the input data to the frame. The second communication circuit obtains from the frame, which has cycled through each of the slave instruments and returned (received), the input data of each instrument.

When following several different communication standards, the communication circuit transmits the frame storing the output data to one instrument, then receives from the instrument, as a response thereto, the frame storing the input data. Another instrument is targeted and similar transmission and reception are performed seamlessly.

As understood from these examples, in the transmission/reception process, there may be no separation between a time slot where only transmission is performed and a time slot where only reception is performed.

When the transmission/reception process is complete, the DMA control circuit within the communication circuit transfers (copies) the input data from the communication circuit buffer to the transfer buffer. When the transfer is complete, the communication circuit sends an input transfer completion notification to the microprocessor 100.

The communication circuit itself executes and controls the transmission/reception process and the input transfer process, which follow the output transfer process. Therefore, after the microprocessor 100 has sent an instruction to the communication circuit to initiate output transfer, there is nothing to perform with respect to the input/output process until the input transfer completion notification is received. The microprocessor 100 may be made to execute the system program or other control program using this time.

Initiation of the transmission/reception process may also have as a trigger a transmission/reception initiation signal (in a case initiating not with reception but with transmission, a transmission initiation signal) having a constant period with respect to the communication circuit. The system timer may generate the transmission/reception initiation signal, or the communication circuit itself may include a timer generating the transmission/reception initiation signal. An interval of time between the control cycle initiation interrupt T and the transmission/reception initiation signal is preferably always constant.

The flow chart shown in FIG. 11 is a concrete process for the system program 210 executed by the microprocessor 100 in order to achieve the sequence illustrated in FIG. 10.

With reference to FIG. 11, the microprocessor 100 executes the execution preparation process of the control operation of the PLC 1 in the system program 210 (step S1). Next, the microprocessor 100 executes the execution control process of the control operation of the PLC 1 in the system program 210 (step S2, shown in FIG. 5). A detailed example of the execution control process of the control operation of the PLC 1 corresponds to steps S200 through S216.

First, the microprocessor 100 waits for the control cycle initiation interrupt (step S200). When the control cycle initiation interrupt is received (YES in step S200), the microprocessor 100 executes the first output copy command and also executes the second output copy command (step S202). Due to execution of the first output copy command, the microprocessor 100 copies the first output data from the calculation buffer 1043 in the main memory 104 to the first transfer buffer 1044. Also, due to execution of the second output copy command, the microprocessor 100 copies the second output data from the calculation buffer 1043 in the main memory 104 to the second transfer buffer 1045. Herein, the first output data and the second output data in the calculation buffer 1043 may be identical data.

When execution of at least the first output copy command is complete, the microprocessor 100 executes the first output transfer command. Also, when execution of at least the second output copy command is complete, the microprocessor 100 executes the second output transfer command (step S204). In step S204, the time of executing the first output transfer command is A1 and the time of executing the second output transfer command is A2. Due to execution of the first output transfer command, an instruction is given to the first communication circuit (PLC system bus controller 120) to initiate output transfer. Also, due to execution of the second output transfer command, an instruction is given to the second communication circuit (field network controller 140) to initiate output transfer. Then, the first communication circuit and the second communication circuit, respectively, transfer (copy) the output data from the transfer buffers 1044 and 1045 to the communication circuit buffers 126 and 146; perform the transmission/reception process between the first instrument and the second instrument; and transfer the input data received by the communication circuit buffers 126 and 146 to the transfer buffers 1044 and 1045. When one cycle of the process is complete, the first communication circuit and the second communication circuit each produce the input transfer completion notification. Accordingly, the input transfer process conclusion time G is the time when the microprocessor 100 receives each of the input transfer completion notifications.

After step S204, the microprocessor 100 waits for the input transfer completion notification from the communication circuit (step S206). Herein, the process waiting for the first input transfer completion notification from the first communication circuit and the process waiting for the second input transfer completion notification from the second communication circuit are performed independently. In other words, when the first input transfer completion notification from the first communication circuit is received, the microprocessor 100 executes the first input copy command regardless of whether the second input transfer completion notification has been received. Also, when the second input transfer completion notification from the second communication circuit is received, the microprocessor 100 executes the second input copy command regardless of whether the first input transfer completion notification has been received (step S208). Due to execution of the first input copy command, the microprocessor 100 copies the input data from the first transfer buffer in the main memory 104 to the calculation buffer 1043. Also, due to execution of the second input copy command, the microprocessor 100 copies the input data from the second transfer buffer in the main memory 104 to the calculation buffer 1043. After the microprocessor 100 has executed one of the first output transfer command and the second output transfer command, the process advances to step S210.

In step S210, the microprocessor 100 executes the control program initiation command. Then, the microprocessor 100 waits for the control program 230 execution ended notification (step S212).

Due to execution of the control program initiation command, execution of the control program 230 is initiated. Accompanying this, the process executed by the microprocessor 100 switches from the process with the system program 210 to the process with the control program 230. In other words, between initiating execution of the control program 230 and the execution ending, the microprocessor 100 does not execute the system program 210. Thereafter, when a notification occurs that execution of the control program 230 has ended (control program 230 execution ended notification), the process to be executed in the microprocessor 100 reverts from the control program 230 to the system program 210.

When the control program 230 execution ended notification is received (YES in step S212), the microprocessor 100 executes other processes (step S214). When execution of the other processes is initiated, the microprocessor 100 waits for the other processes execution ended notification, or for the next control cycle initiation interrupt (step S216).

When the other processes execution ended notification is received before the next control cycle initiation interrupt is received ("execution ended notification" in step S216), the process beginning at step S200 is executed once again. In contrast, when the next control cycle initiation interrupt is received before the other processes execution ended notification ("control cycle initiation" in step S216), execution of the other processes is interrupted and the process beginning at step S202 is executed once again.

As in the above, the microprocessor 100 according to the present embodiment controls at least one of the first communication circuit and the second communication circuit (steps S204 and S206 in FIG. 11) such that, during a period from one of the first output transfer process and the second output transfer process being initiated until the input transfer process corresponding to the output transfer process is completed (in FIG. 10, the period from the output transfer process initiation time A1 (or A2) until the input transfer process conclusion time G1 (or G2)), the other of the output transfer processes is initiated.

According to Embodiment 1, when the input/output process is performed continuously, the first input/output process and the second input/output process can be executed in parallel.

H. Overall Process Operation

Embodiment 2

A different concrete embodiment of the input/output process of the sequence shown in FIG. 6 is described as Embodiment 2. An example of the case where the input/output process is performed integrally is illustrated in Embodiment 2.

Figure 12:
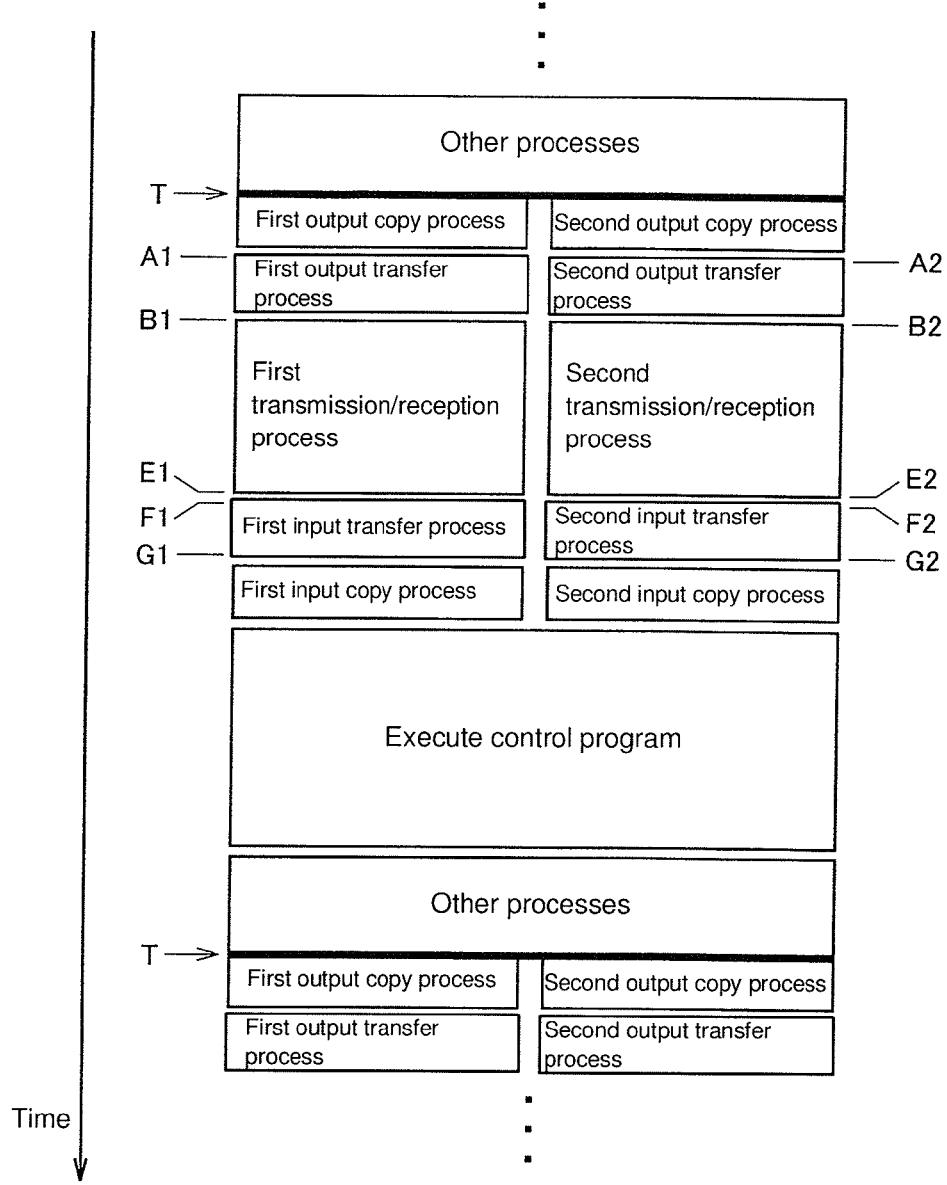
FIG. 12 is a sequence diagram of operations of the CPU unit according to Embodiment 2 of the present invention.
Figure 13:
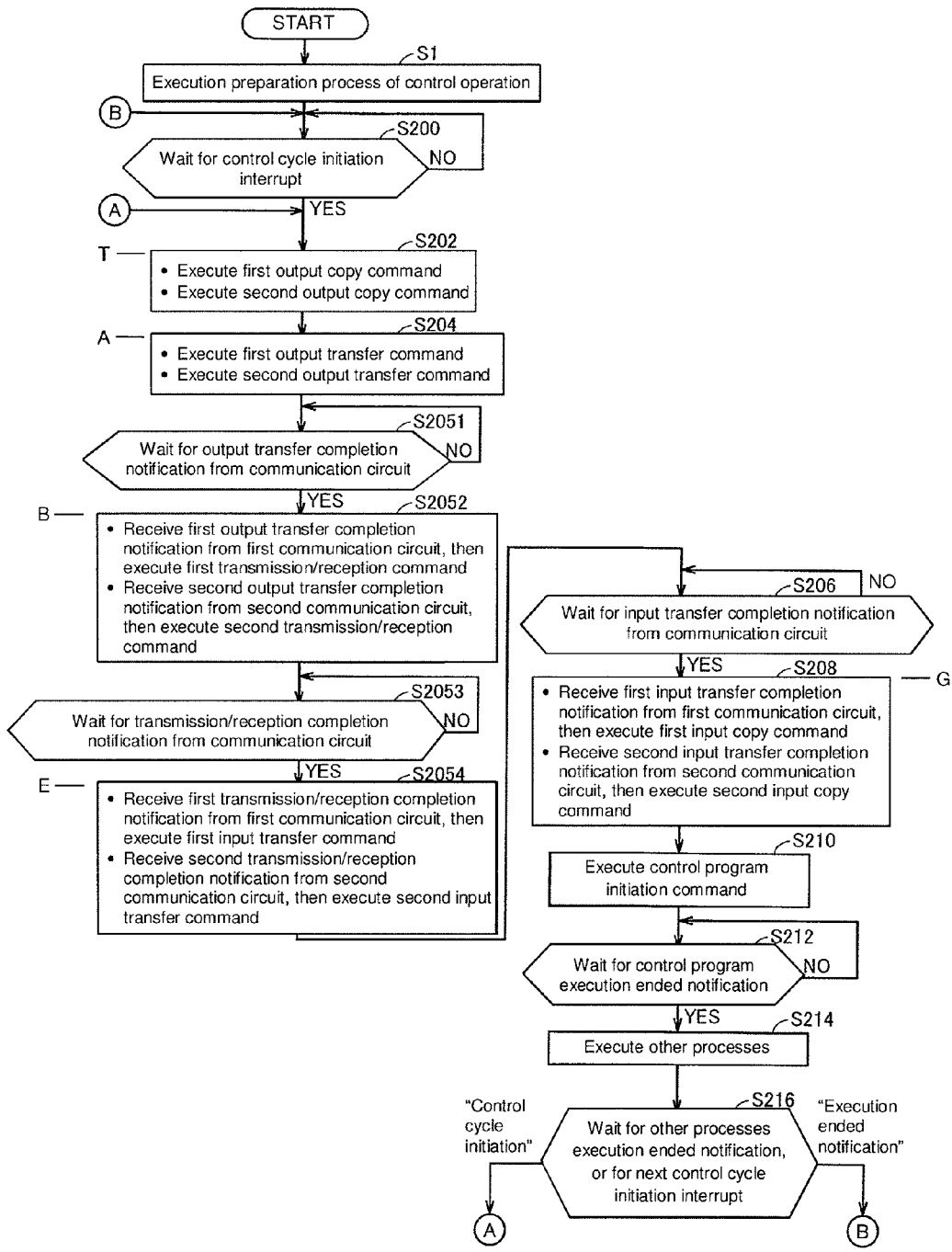
FIG. 13 is a flow chart corresponding to the sequence diagram shown in FIG. 12.

FIG. 12 is a sequence diagram of operations of the CPU unit 13 according to Embodiment 2 of the present invention. FIG. 13 is a flow chart corresponding to the sequence diagram shown in FIG. 12.

With reference to FIG. 12, the input/output process in the sequence shown in FIG. 6 is configured, more specifically, by the output transfer process, the transmission/reception process, and the input transfer process.

A difference with the concrete example in Embodiment 1 described above is that the microprocessor 100 gives an instruction to the communication circuit to initiate the transmission/reception process and to initiate the input transfer process. Moreover, the communication circuit notifies the microprocessor 100 that the output transfer process is complete and that the transmission/reception process is complete. In general, because the transmission/reception process, which is a process communicating with the exterior of the CPU unit 13, requires a longer time as compared to the output transfer process and the input transfer process, which are processes within the CPU unit 13, executing the transmission/reception process in parallel is important.

The flow chart shown in FIG. 13 differs as compared with the flow chart shown in FIG. 11 in that the processes of steps S2051 to S2054 are added. Hereafter, a description is given chiefly regarding these differences, and a detailed description of other processes is not reiterated.

After the microprocessor 100 executes the first output transfer command and also executes the second output transfer command (step S204), the microprocessor 100 waits for the output transfer completion notification from the communication circuit (step S2051). Herein, the process waiting for the first output transfer completion notification from the first communication circuit and the process waiting for the second output transfer completion notification from the second communication circuit are performed independently. In other words, when the first output transfer completion notification from the first communication circuit is received, the microprocessor 100 executes the first transmission/reception command regardless of whether the second output transfer completion notification has been received. Also, when the second output transfer completion notification from the second communication circuit is received, the microprocessor 100 executes the second transmission/reception command regardless of whether the first output transfer completion notification has been received (step S2052).

In step S2052, the time of executing the first transmission/reception command is B1 and the time of executing the second transmission/reception command is B2. Moreover, in order to make a period of transmission/reception constant, the first transmission/reception command and/or the second transmission/reception command may be executed after waiting for a trigger signal from the system timer 108 or the like having a constant period.

Due to execution of the first transmission/reception command in step S2052, an instruction is given to the first communication circuit (PLC system bus controller 120) to initiate transmission/reception. Also, due to execution of the second transmission/reception command, an instruction is given to the second communication circuit (field network controller 140) to initiate transmission/reception. Then, when the transmission/reception process between each of the first instrument and the second instrument is complete, the first communication circuit and the second communication circuit each produce the transmission/reception completion notification.

After step S2052, the microprocessor 100 waits for the transmission/reception transfer completion notification from the communication circuit (step S2053). Herein, the process waiting for the first transmission/reception completion notification from the first communication circuit and the process waiting for the second transmission/reception completion notification from the second communication circuit are performed independently. In other words, when the first transmission/reception completion notification from the first communication circuit is received, the microprocessor 100 executes the first input transfer command regardless of whether the second transmission/reception completion notification has been received. Also, when the second transmission/reception completion notification from the second communication circuit is received, the microprocessor 100 executes the second input transfer command regardless of whether the first transmission/reception completion notification has been received (step S2054).

In step S2054, the time of executing the first input transfer command is E1 and the time of executing the second input transfer command is E2. In general, considering that the time required for the output transfer process is comparatively short and the time required for the transmission/reception process is comparatively long, with the above-noted process, the first transmission/reception process and the second transmission/reception process can in fact be executed in parallel.

As in the above, the microprocessor 100 according to the present embodiment controls at least one of the first communication circuit and the second communication circuit (steps S204 through S206 in FIG. 13) such that, during a period from one of the first transmission/reception process (being the first transmission process and the first reception process) and the second transmission/reception process (being the second transmission process and the second reception process) being initiated until the transmission/reception process is completed (in FIG. 12, the period from the transmission process initiation time B1 (or B2) until the transmission/reception process conclusion time E1 (or E2)), the other of the transmission/reception processes is initiated, or could be initiated.

According to Embodiment 2, when the input/output process is performed continuously, the first transmission/reception process and the second transmission/reception process can be executed in parallel.

I. Overall Process Operation

Embodiment 3

A concrete embodiment of the input/output process of the sequence shown in FIG. 9 is described as Embodiment 3. An example of the case where the input/output process is divided into the output process and the input process to be performed is illustrated in Embodiment 3.

Figure 14:
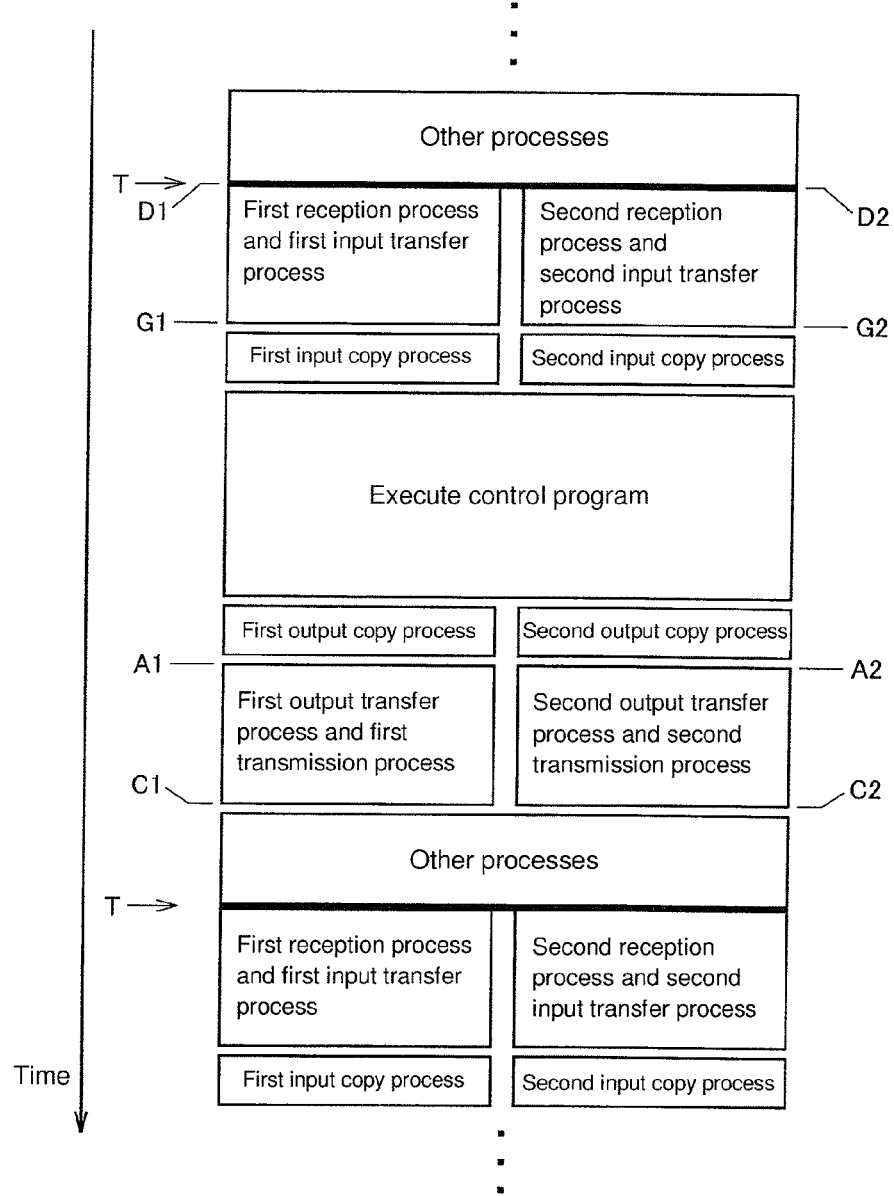
FIG. 14 is a sequence diagram of operations of the CPU unit according to Embodiment 3 of the present invention.
Figure 15:
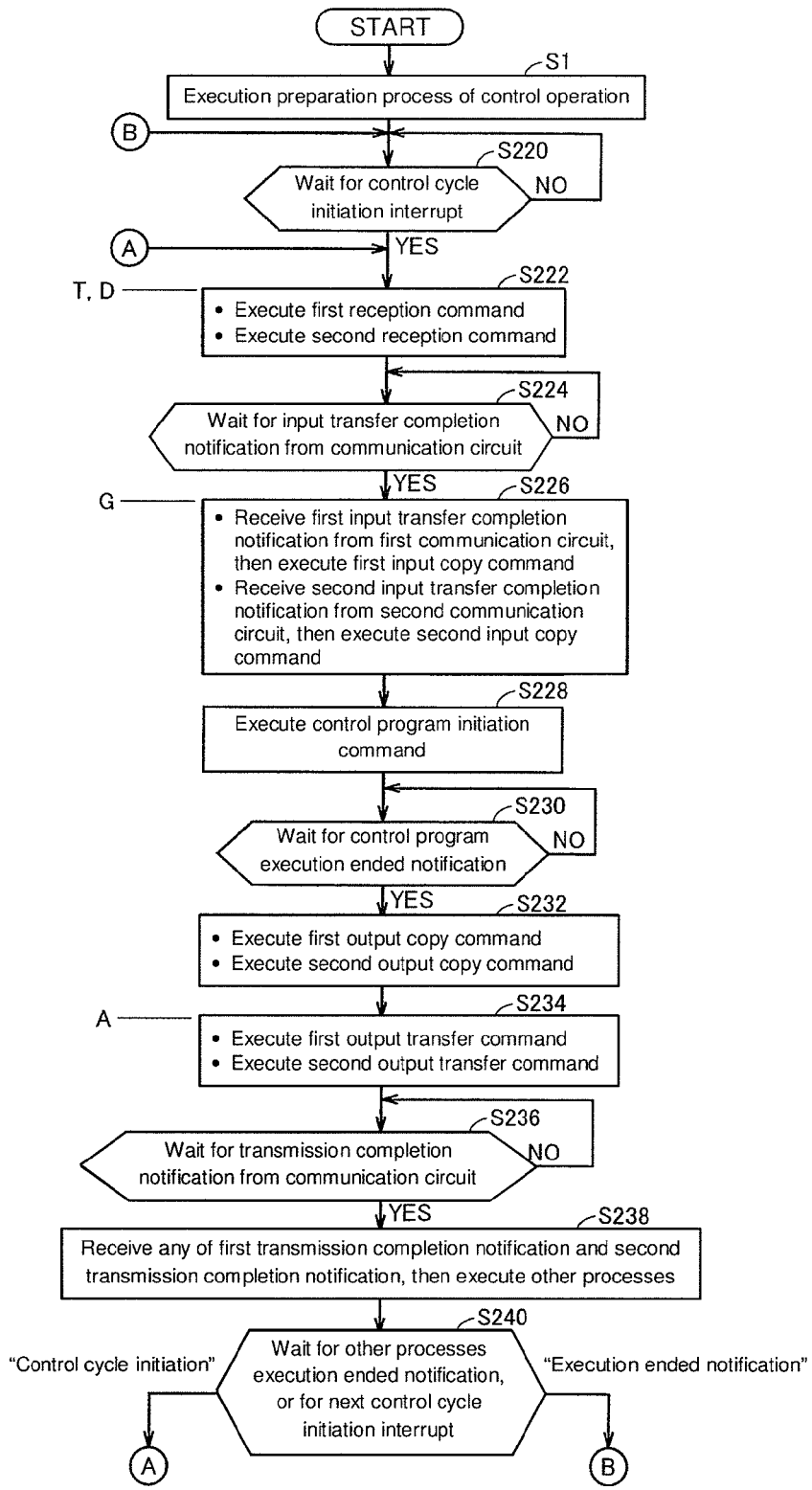
FIG. 15 is a flow chart corresponding to the sequence diagram shown in FIG. 14.

FIG. 14 is a sequence diagram of operations of the CPU unit 13 according to Embodiment 3 of the present invention. FIG. 15 is a flow chart corresponding to the sequence diagram shown in FIG. 14.

With reference to FIG. 14, the input process in the sequence shown in FIG. 9 is configured, more specifically, by a reception process and an input transfer process. Also, the output process in the sequence in FIG. 9 is configured by an output transfer process and a transmission process.

When the control cycle initiation interrupt is received, by executing the reception command, the microprocessor 100 gives an instruction to the communication circuit (the PLC system bus controller 120 and the field network controller 140) to initiate reception of the input data. When the communication circuit receives this instruction, the communication control circuit (PLC system bus communication control circuit 124 and field network communication control circuit 144) within the communication circuit gives an instruction to the instruments to send the input data, then the input data transmitted from the instruments in response to the instruction is received and stored in the communication circuit buffers 126 and 146. When the reception of the input data is complete, the DMA control circuit (DMA control circuits 122 and 142) within the communication circuit transfers (copies) the input data from the communication circuit buffer to the transfer buffers 1044 and 1045. When the transfer is complete, the communication circuit sends the input transfer completion notification to the microprocessor 100. When the input transfer completion notification is received, by executing the input copy command, the microprocessor 100 copies the input data from the transfer buffers 1044 and 1045 to the calculation buffer 1043.

When the control program execution ended notification is received, by executing the output copy command, the microprocessor 100 copies the output data from the calculation buffer 1043 to the transfer buffers 1044 and 1045. When the output copying is complete, by executing the output transfer command, the microprocessor 100 gives an instruction to the communication circuit to initiate output transfer. When the communication circuit receives this instruction, the DMA control circuit within the communication circuit transfers (copies) the output data from the transfer buffers 1044 and 1045 to the communication circuit buffer. When the transfer is complete, the communication control circuit within the communication circuit transmits the output data from the communication circuit buffer to the instruments. When the transmission process is complete, the communication circuit sends a transmission completion notification to the microprocessor 100.

The flow chart shown in FIG. 15 is a concrete process for the system program 210 executed by the microprocessor 100 in order to achieve the sequence illustrated in FIG. 14.

With reference to FIG. 15, the microprocessor 100 executes the execution preparation process of the control operation of the PLC 1 in the system program 210 (step S1). Next, the microprocessor 100 executes the execution control process of the control operation of the PLC 1 in the system program 210 (step S2, shown in FIG. 5). A detailed example of the execution control process of the control operation of the PLC 1 corresponds to steps S220 through S240.

First, the microprocessor 100 waits for the control cycle initiation interrupt (step S220). When the control cycle initiation interrupt is received (YES in step S220), the microprocessor 100 executes the first reception command and also executes the second reception command (step S222). Then, the microprocessor 100 waits for the input transfer completion notification from the communication circuit (step S224).

The process of step S222 is initiated at the reception process initiation time D, which is the time when the control cycle initiation interrupt T is received. Due to execution of the first reception command, an instruction is given to the first communication circuit (PLC system bus controller 120) to initiate reception of the input data. Also, due to execution of the second reception command, an instruction is given to the second communication circuit (field network controller 140) to initiate reception of the input data. Then, the first communication circuit and the second communication circuit, respectively, give an instruction to the first instrument and the second instrument to send the input data, then the input data sent from each of the first instrument and second instrument in response to the instruction is received and stored in the communication circuit buffers 126 and 146. Moreover, the first communication circuit and the second communication circuit transfer (copy) the input data from the communication circuit buffers 126 and 146 to the transfer buffers 1044 and 1045. When one cycle of the reception process is complete, the first communication circuit and the second communication circuit each produce the input transfer completion notification. Accordingly, the input transfer process completion time G is the time when the microprocessor 100 receives each of the input transfer completion notifications.

When the first input transfer completion notification from the first communication circuit is received, the microprocessor 100 executes the first input copy command. Also, when the second input transfer completion notification from the second communication circuit is received, the microprocessor 100 executes the second input copy command (step S208). Due to execution of the first input copy command, the microprocessor 100 copies the input data from the first transfer buffer in the main memory 104 to the calculation buffer 1043. Also, due to execution of the second input copy command, the microprocessor 100 copies the input data from the second transfer buffer in the main memory 104 to the calculation buffer 1043. After the microprocessor 100 has executed one of the first output transfer command and the second output transfer command, the process advances to step S228.

In step S228, the microprocessor 100 executes the control program initiation command. Then, the microprocessor 100 waits for the control program 230 execution ended notification (step S230).

Due to execution of the control program initiation command, execution of the control program 230 is initiated. Accompanying this, the process executed by the microprocessor 100 switches from the process with the system program 210 to the process with the control program 230. In other words, between initiating execution of the control program 230 and the execution ending, the microprocessor 100 does not execute the system program 210. Thereafter, when a notification that execution of the control program 230 has ended (control program 230 execution ended notification) occurs, the process to be executed in the microprocessor 100 reverts from the control program 230 to the system program 210.

Thereafter, when the control program execution ended notification is received (YES in step S230), the microprocessor 100 executes the first output copy command and also executes the second output copy command (step S232). Due to execution of the first output copy command, the microprocessor 100 copies the output data from the calculation buffer 1043 in the main memory 104 to the first transfer buffer 1044. Also, due to execution of the second output copy command, the microprocessor 100 copies the output data from the calculation buffer 1043 in the main memory 104 to the second transfer buffer 1045.

When execution of at least the first output copy command is complete, the microprocessor 100 executes the first output transfer command. Also, when execution of at least the second output copy command is complete, the microprocessor 100 executes the second output transfer command (step S234). Then, the microprocessor 100 waits for the transfer completion notification from the communication circuit (step S236). In step S234, the time of executing the first output transfer command is A1 and the time of executing the second output transfer command is A2.

Due to execution of the first output transfer command, an instruction is given to the first communication circuit (PLC system bus controller 120) to initiate output transfer. Also, due to execution of the second output transfer command, an instruction is given to the second communication circuit (field network controller 140) to initiate output transfer. Then, the first communication circuit and the second communication circuit, respectively, transfer (copy) the output data from the transfer buffers 1044 and 1045 to the communication circuit buffers 126 and 146 and perform the transmission process with respect to the first instrument and the second instrument. When one cycle of the process is complete, the first communication circuit and the second communication circuit each produce the transmission completion notification.

When one of the first transmission completion notification and the second transmission completion notification is received from the communication circuit, the microprocessor 100 executes the other processes (step S238). When execution of the other processes is initiated, the microprocessor 100 waits for the other processes execution ended notification, or for the next control cycle initiation interrupt (step S240).

When the other processes execution ended notification is received before the next control cycle initiation interrupt is received ("execution ended notification" in step S240), the process beginning at step S220 is executed once again. In contrast, when the next control cycle initiation interrupt is received before the other processes execution ended notification is received ("control cycle initiation" in step S240), execution of the other processes is interrupted and the process beginning at step S222 is executed once again.

As in the above, the microprocessor 100 according to the present embodiment controls at least one of the first communication circuit and the second communication circuit (steps S234 and S236 in FIG. 15) such that, during a period from one of the first output transfer process and the second output transfer process being initiated until the transmission process corresponding to the output transfer process is completed (in FIG. 14, from the output transfer process initiation time A1 (or A2) to the transmission process conclusion time C1 (or C2)), the other of the output transfer processes is initiated, or could be initiated.

Figure 16:
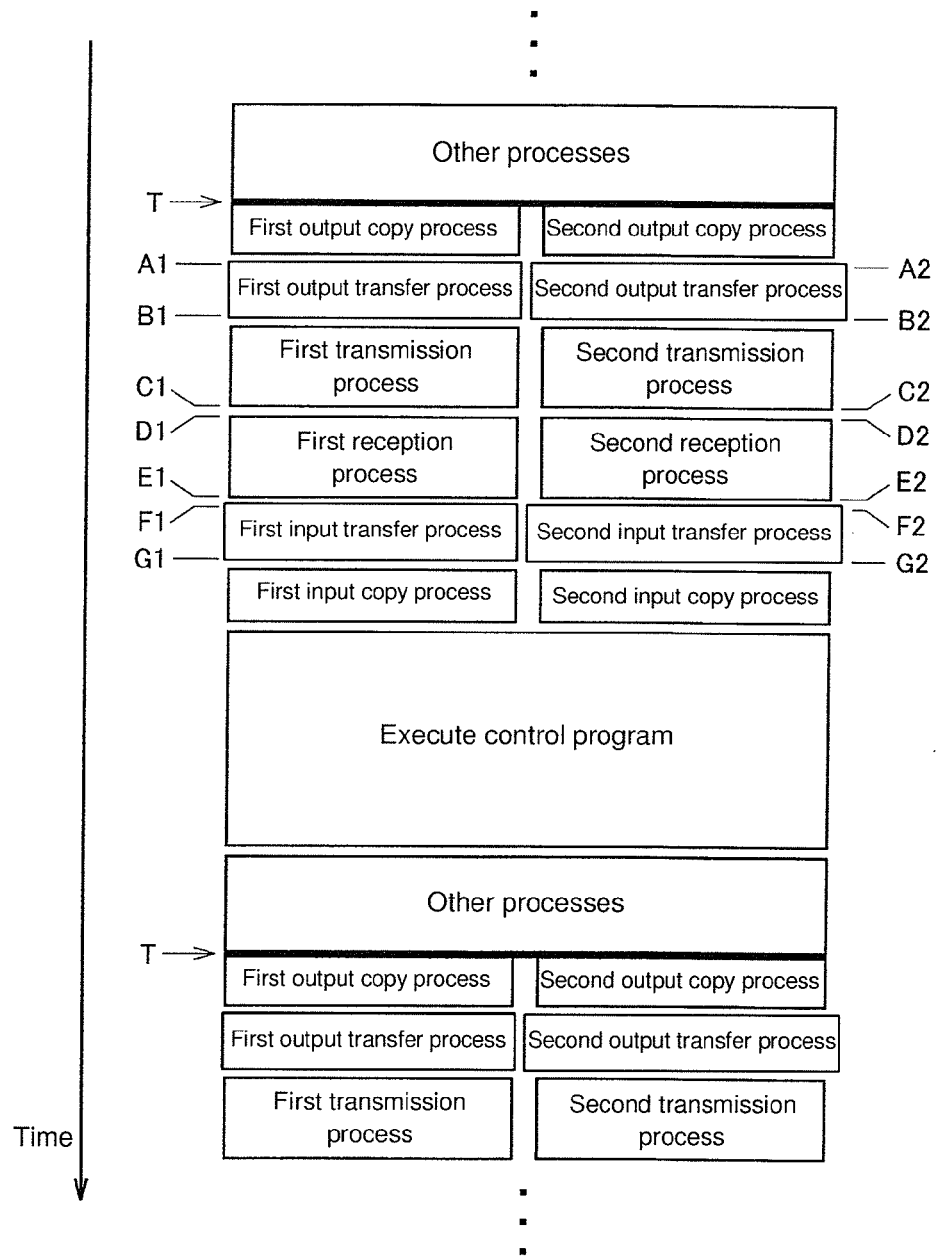
FIG. 16 is a sequence diagram of operations of the CPU unit according to Embodiment 4 of the present invention.

In addition, the microprocessor 100 according to the present embodiment controls at least one of the first communication circuit and the second communication circuit such that, during a period from one of the first reception process and the second reception process being initiated until the input transfer process corresponding to the reception process is completed (in FIG. 16, from the reception process initiation time D1 (or D2) to the input transfer process conclusion time G1 (or G2)), the other of the reception processes is initiated, or could be initiated.

According to Embodiment 3, when the input/output process is divided into the output process and the input process to be performed, the first output process and the second output process can be executed in parallel, and the first input process and the second input process can be executed in parallel.

J. Overall Process Operation

Embodiment 4

A concrete embodiment of the input/output process of the sequence shown in FIG. 8 is described as Embodiment 4. An example of the case where the input/output process is divided into the output process and the input process to be performed is illustrated in Embodiment 4.

Figure 17:
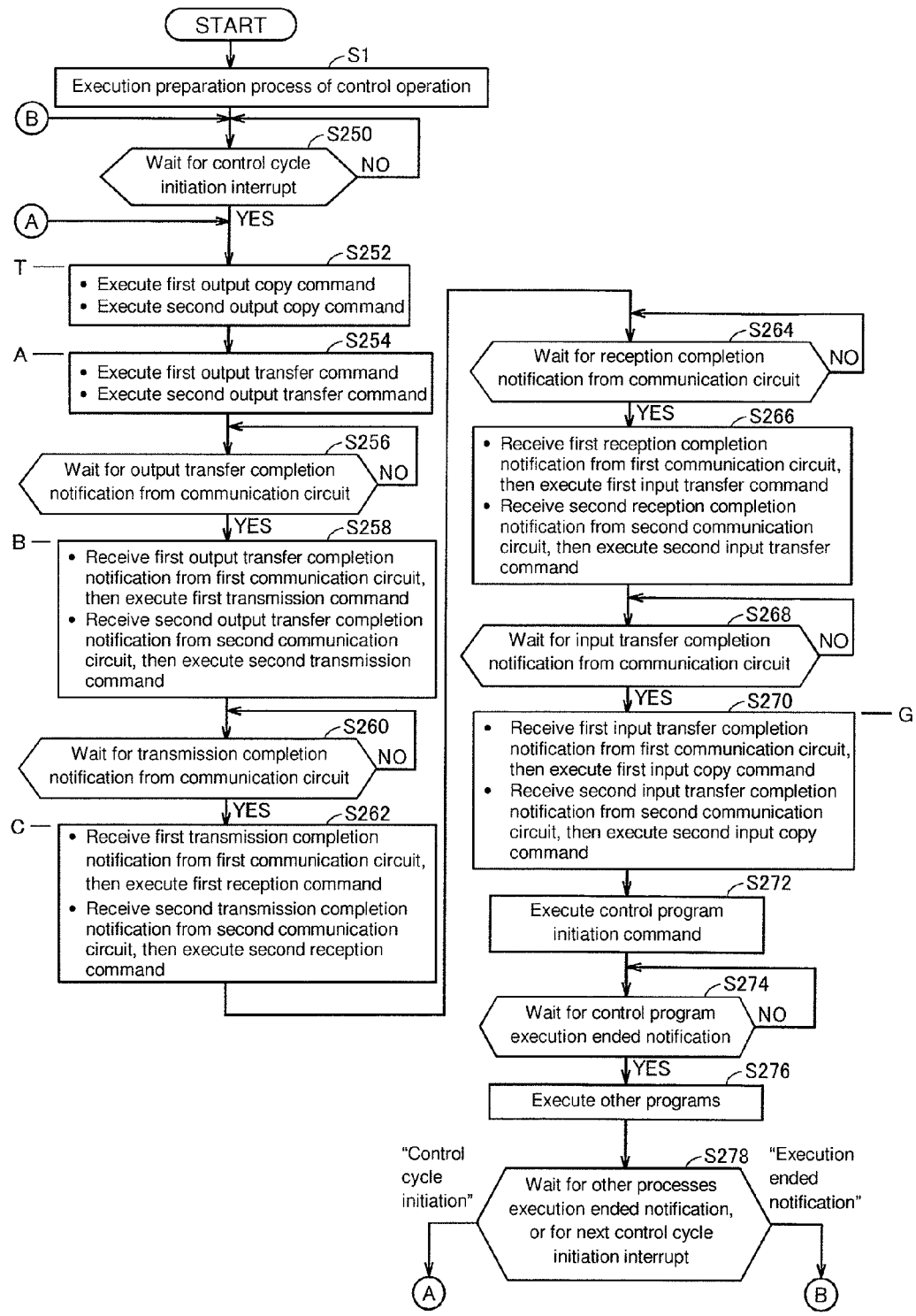
FIG. 17 is a flow chart corresponding to the sequence diagram shown in FIG. 16.

FIG. 16 is a sequence diagram of operations of the CPU unit 13 according to Embodiment 4 of the present invention. FIG. 17 is a flow chart corresponding to the sequence diagram shown in FIG. 16.

With reference to FIG. 16, the output process in the sequence shown in FIG. 8 is configured, more specifically, by the output transfer process and the transmission process. Also, the input process in the sequence in FIG. 8 is configured by the reception process and the input transfer process. By executing the commands to initiate each of these processes, the microprocessor 100 gives an instruction to the communication circuit to initiate each of the processes. When the execution of each of the processes is complete, the communication circuit sends the process completion notifications to the microprocessor 100.

As shown in FIGS. 9 and 14, each of these processes may also be configured to execute in an order that achieves a sequence of a type where each of the processes is separated into the input process and the output process to be performed, with execution of the control program therebetween.

The flow chart shown in FIG. 17 is a concrete process for the system program 210 executed by the microprocessor 100 in order to achieve the sequence illustrated in FIG. 16.

With reference to FIG. 17, the microprocessor 100 executes the execution preparation process of the control operation of the PLC 1 in the system program 210 (step S1).

Next, the microprocessor 100 executes the execution control process of the control operation of the PLC 1 in the system program 210 (step S2, shown in FIG. 5). A detailed example of the execution control process of the control operation of the PLC 1 corresponds to steps S250 through S278.

First, the microprocessor 100 waits for the control cycle initiation interrupt (step S250). When the control cycle initiation interrupt is received (YES in step S250), the microprocessor 100 executes the first output copy command and also executes the second output copy command (step S252). When execution of at least the first output copy command is complete, the microprocessor 100 executes the first output transfer command. Also, when execution of at least the second output copy command is complete, the microprocessor 100 executes the second output transfer command (step S254). Then, the microprocessor 100 waits for the output transfer completion notification from the communication circuit (step S256). In step S254, the time of executing the first output transfer command is A1 and the time of executing the second output transfer command is A2.

When the first output transfer completion notification from the first communication circuit is received, the microprocessor 100 executes the first transmission command. Also, when the second output transfer completion notification from the second communication circuit is received, the microprocessor 100 executes the second transmission command (step S258). Then, the microprocessor 100 waits for the transmission completion notification from the communication circuit (step S260). In step S258, the time of executing the first transmission command is B1 and the time of executing the second transmission command is B2.

Due to execution of the first transmission command, an instruction is given to the first communication circuit (PLC system bus controller 120) to initiate transmission. Also, due to execution of the second transmission command, an instruction is given to the second communication circuit (field network controller 140) to initiate transmission. Then, the first communication circuit and the second communication circuit, respectively, perform the transmission process with respect to the first instrument and the second instrument. When the transmission process is complete, the first communication circuit and the second communication circuit each produce the transmission completion notification.

When the first transmission completion notification from the first communication circuit is received, the microprocessor 100 executes the first reception command. Also, when the second transmission completion notification from the second communication circuit is received, the microprocessor 100 executes the second reception command (step S262). Then, the microprocessor 100 waits for the reception completion notification from the communication circuit (step S264). In step S262, the time of receiving the first transmission completion notification is C1 and the time of receiving the second transmission completion notification is C2.

When the first reception completion notification from the first communication circuit is received, the microprocessor 100 executes the first input transfer command. Also, when the second reception completion notification from the second communication circuit is received, the microprocessor 100 executes the second input transfer command (step S266). Then, the microprocessor 100 waits for the input transfer completion notification from the communication circuit (step S268). In step S266, the time of receiving the first reception completion notification is E1 and the time of receiving the second reception completion notification is E2.

When the first input transfer completion notification from the first communication circuit is received, the microprocessor 100 executes the first input copy command. Also, when the second input transfer completion notification from the second communication circuit is received, the microprocessor 100 executes the second input copy command (step S270). When one of execution of the first input copy command and execution of the second output copy command is complete, the microprocessor 100 executes the control program initiation command (step S272). Then, the microprocessor 100 waits for the control program 230 execution ended notification (step S274).

When the control program 230 execution ended notification is received (YES in step S274), the microprocessor 100 executes the other processes (step S276). When execution of the other processes is initiated, the microprocessor 100 waits for the other processes execution ended notification, or for the next control cycle initiation interrupt (step S278).

When the other processes execution ended notification is received before the next control cycle initiation interrupt is received ("execution ended notification" in step S278), the process beginning at step S250 is executed once again. In contrast, when the next control cycle initiation interrupt is received before the other processes execution ended notification ("control cycle initiation" in step S278), execution of the other processes is interrupted and the process beginning at step S252 is executed once again.

As in the above, the microprocessor 100 according to the present embodiment controls at least one of the first communication circuit and the second communication circuit (steps S258 and S260 in FIG. 17) such that, during a period from one of the first transmission process and the second transmission process being initiated until the transmission process is completed (in FIG. 16, from the transmission process initiation time B1 (or B2) to the transmission process conclusion time C1 (or C2)), the other of the transmission processes is initiated, or could be initiated.

In addition, the microprocessor 100 according to the present embodiment controls at least one of the first communication circuit and the second communication circuit (steps S262 and S264 in FIG. 17) such that, during a period from one of the first reception process and the second reception process being initiated until the reception process is completed (in FIG. 16, from the reception process initiation time D1 (or D2) to the reception process conclusion time E1 (or E2)), the other of the reception processes is initiated, or could be initiated.

According to Embodiment 4, when the input/output process is divided into the output process and the input process to be executed, the first transmission process and the second transmission process can be executed in parallel, and the first reception process and the second reception process can be executed in parallel.

Further, in the above description, a description was given of cases where configurations of procedural elements in the process of the "first" system and the process of the "second" system were mutually identical. However, the configurations of the procedural elements may also differ from one another in the process of the "first" system and the process of the "second" system. For example, a combination is possible in which, in the "first" system (i.e., communication using the PLC system bus 11), as shown in FIG. 16, the process advances while performing the initiation instruction from the microprocessor and the process completion notification from the communication circuit for each of the output transfer process, transmission process, reception process, and input transfer process, while in the "second" system (i.e., communication using the field network 2), as shown in FIG. 10, after the instruction to initiate the output transfer process is given by the microprocessor, the communication circuit itself controls execution of the transmission/reception process and input transfer process, which follow the output transfer process. In such a case, both the "first" system and the "second" system have in common that they perform input/output processing, and thus the meaning of parallel execution conforms to the example of FIG. 6.

K. Overall Process Operation

Embodiment 5

Embodiment 5 describes exemplary operations in a case where a plurality of control programs are executed with time-sharing.

Figure 20:
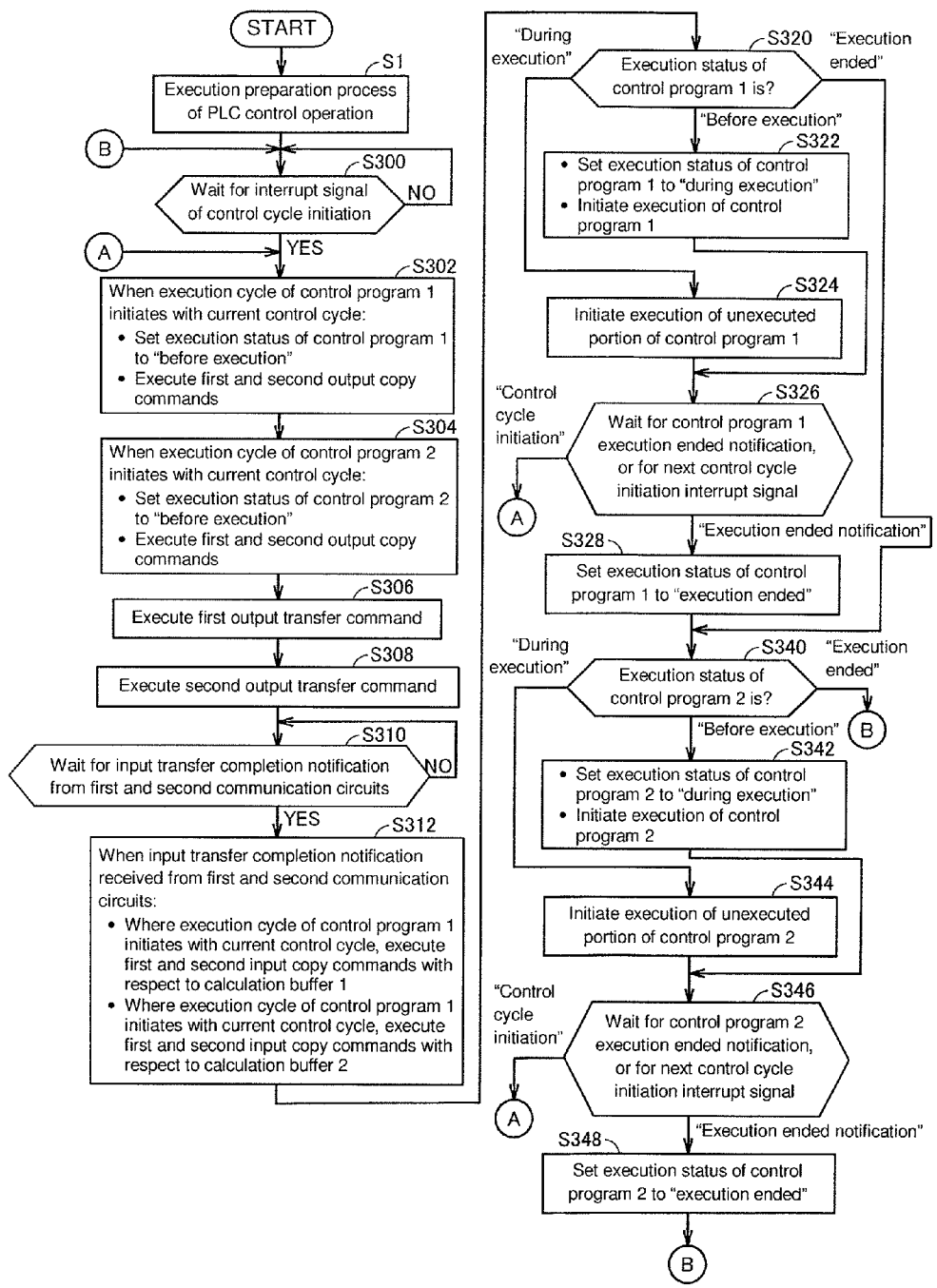
FIG. 20 is a flow chart corresponding to FIGS. 18 and 19.

FIG. 18 is a sequence diagram of operations (input direction) of the CPU unit 13 according to Embodiment 5 of the present invention. FIG. 19 is a sequence diagram of operations (output direction) of the CPU unit 13 according to Embodiment 5 of the present invention. FIG. 20 is a flow chart corresponding to FIGS. 18 and 19.

FIGS. 18 and 19 depict, as a concrete example, a case where a control program 1 having a high execution priority and a control program 2 having a low execution priority are executed. At this point, the execution cycle of the control program 1 is two control cycle periods (control cycles 1 to 2 and 3 to 4), and the execution cycle of the control program 2 is four control cycle periods (control cycles 1 to 4).

Further, as the execution preparation process of the control operation, the system program 210 is configured to generate a calculation buffer 1 corresponding to the first program 1, then generate a calculation buffer 2 corresponding to the control program 2. A description is given, using these calculation buffers, of a method of synchronizing to an execution cycle to update input/output data.

In the sequence diagrams shown in FIGS. 18 and 19, a processing method described in Embodiment 1 above is used for the input/output process. However, in the present embodiment, the execution cycle of the control programs spans a plurality of control cycles; therefore, an effective input/output process for each of the control programs is configured to be performed only during a control cycle in which the execution cycle of that control program is initiated. "An effective input/output process" refers, for the output process, to a process where the output data updated by execution of the control program is transmitted to the instruments and, for the input process, to a process where the calculation buffers are updated by the input data received from the instruments.

In Embodiment 5, the input/output process (output transfer process, transmission/reception process, input transfer process) itself is executed in every control cycle. However, effectiveness of the input/output process is controlled by which control cycle the output copy process and the input copy process are performed in.

When the input/output process is executed in every control cycle, a given transmission/reception process is performed with a constant period, and thus there is an advantage that monitoring of operation conditions of the PLC system bus 11 and the field network 2 can be readily performed. Meanwhile, the input/output process may also be configured to be performed only in a control cycle in which an effective input/output process can be performed (a control cycle in which the execution cycle of the control program is initiated). Thereby, resource consumption can be reduced for the microprocessor 100, along with the PLC system bus 11 and the field network 2.

Further, in FIGS. 18 and 19, the control program 2 may also be executed using an amount of time of the input/output process. For example, when execution of the control program 2 is initiated in the control cycle 2 and execution does not conclude within the control cycle 2, the unexecuted portion of the control cycle 2 may be executed in control cycle 3 using the amount of time in which the PLC system bus controller 120 and the field network controller 140 perform the input/output process.

The flow chart shown in FIG. 20 is a concrete process for the system program 210 executed by the microprocessor 100 in order to achieve the sequences illustrated in FIGS. 18 and 19.

With reference to FIG. 20, the microprocessor 100 executes the execution preparation process of the control operation of the PLC 1 in the system program 210 (step S1). Next, the microprocessor 100 executes the execution control process of the control operation of the PLC 1 in the system program 210 (step S2 shown in FIG. 5). A detailed example of the execution control process of the control operation of the PLC 1 corresponds to steps S300 through S348.

First, the microprocessor 100 waits for the control cycle initiation interrupt signal (step S300). When the control cycle initiation interrupt signal is received (YES in step S300), in a case where the execution cycle of the control program 1 initiates at the current control cycle, the microprocessor 100 sets the execution status of the control program 1 to "before execution," then executes the first output copy command and also executes the second output copy command (step S302). Due to execution of the first output copy command, the microprocessor 100 copies the output data stored in the calculation buffer 1 to the first transfer buffer. Also, due to execution of the second output copy command, the microprocessor 100 copies the output data stored in the calculation buffer 1 to the second transfer buffer.

Next, when the execution cycle of the control program 2 initiates at the current control cycle, the microprocessor 100 sets the execution status of the control program 2 to "before execution," then executes the first output copy command and also executes the second output copy command (step S304). Due to execution of the first output copy command, the microprocessor 100 copies the output data stored in the calculation buffer 2 to the first transfer buffer. Also, due to execution of the second output copy command, the microprocessor 100 copies the output data stored in the calculation buffer 2 to the second transfer buffer.

Next, the microprocessor 100 executes the first output transfer command (step S306) and also executes the second output transfer command (step S308). Then, the microprocessor 100 waits for the input transfer completion notification from the first communication circuit and the input transfer completion notification from the second communication circuit (step S310). Herein, the process waiting for the first input transfer completion notification from the first communication circuit and the process waiting for the second input transfer completion notification from the second communication circuit are performed independently.

Due to execution of the first output transfer command, the output process and the input process related to the first transfer buffer are executed. Also, due to execution of the second output transfer command, the output process and the input process related to the second transfer buffer are executed.

When the input transfer completion notification from the first communication circuit or the input transfer completion notification from the second communication circuit is received, the process of step S312 is executed.

In other words, with respect to the calculation buffer 1, in a case where the execution cycle of the control program 1 initiates at the current control cycle, the microprocessor 100 executes the first input copy command when the input transfer completion notification from the first communication circuit is received, and also executes the second input copy command when the input transfer completion notification from the second communication circuit is received. Due to execution of the first input copy command, the microprocessor 100 copies the input data stored in the first transfer buffer to the calculation buffer 1. Also, due to execution of the second input copy command, the microprocessor 100 copies the input data stored in the second transfer buffer to the calculation buffer 1.

Moreover, with respect to the calculation buffer 2, when the execution cycle of the control program 2 initiates at the current control cycle, the microprocessor 100 executes the first input copy command when the input transfer completion notification from the first communication circuit is received, and also executes the second input copy command when the input transfer completion notification from the second communication circuit is received. Due to execution of the first input copy command, the microprocessor 100 copies the input data stored in the first transfer buffer to the calculation buffer 2. Also, due to execution of the second input copy command, the microprocessor 100 copies the input data stored in the second transfer buffer to the calculation buffer 2.

Then, the microprocessor 100 determines the execution status of the control program 1 (step S320).

When the control program 1 is "before execution" ("before execution" in step S320), the microprocessor 100 sets the execution status of the control program 1 to "during execution" and initiates execution of the control program 1 (step S322). Then, the process advances to step S326.

When the control program 1 is "during execution" ("during execution" in step S320), the microprocessor 100 initiates execution of the unexecuted portion of the control program 1 (step S324). Then, the process advances to step S326.

When the control program 1 is "execution ended" ("execution ended" in step S320), the process advances to step S340.

In step S322 or S324, when execution of the control program 1 is initiated (or re-initiated), the microprocessor 100 waits for the control program 1 execution ended notification, or for the interrupt signal for the next control cycle initiation (step S326). Moreover, in step S322 or S324, by initiating (or re-initiating) execution of the control program 1, the process executed by the microprocessor 100 switches from the process with the system program to the process with the control program 1. In other words, between initiating execution of the control program 1 and the execution ending, the microprocessor 100 does not execute the system program. Also, when the next control cycle initiation interrupt occurs before the execution of the control program 1 ends, the realtime OS 200 interrupts the execution of the control program 1 by the microprocessor 100 and re-initiates execution of the system program. Alternatively, when the notification that execution of the control program 1 has ended (control program 1 execution ended notification) occurs, the process to be executed in the microprocessor 100 reverts from the control program 2 to the system program.

When the control program 1 execution ended notification is received ("execution ended notification" in step S326), the microprocessor 100 sets the execution status of the control program 1 to "execution ended" (step S328). Then, the process advances to step S340.

Meanwhile, when the next control cycle initiation interrupt is received before the control program 1 execution ended notification ("control cycle initiation" in step S326), the control program 1 being executed by the microprocessor 100 is interrupted and the microprocessor 100 once again executes the process beginning at step S302.

In step S340, the microprocessor 100 determines the execution status of the control program 2 (step S340).

When the control program 2 is "before execution" ("before execution" in step S340), the microprocessor 100 sets the execution status of the control program 2 to "during execution" and initiates execution of the control program 2 (step S342). Then, the process advances to step S346.

When the control program 2 is "during execution" ("during execution" in step S340), the microprocessor 100 initiates execution of the unexecuted portion of the control program 2 (step S344). Then, the process advances to step S346.

When the control program 2 is "execution ended" ("execution ended" in step S340), the process advances to step S300.

In step S342 or S344, when execution of the control program 2 is initiated (or re-initiated), the microprocessor 100 waits for the control program 2 execution ended notification, or for the interrupt signal for the next control cycle initiation (step S346).

When the control program 2 execution ended notification is received ("execution ended notification" in step S346), the microprocessor 100 sets the execution status of the control program 2 to "execution ended" (step S348). Then, the process advances to step S300.

Meanwhile, when the next control cycle initiation interrupt is received before the control program 2 execution ended notification ("control cycle initiation" in step S346), the control program 2 being executed by the microprocessor 100 is interrupted and the microprocessor 100 once again executes the process beginning at step S302.

According to Embodiment 5, timing of an effective input/output process can be synchronized to the execution cycle of the control programs.

In Embodiment 5, the control programs 1 and 2, respectively, make use of input/output processes mediated by both of the PLC system bus 11 and the field network 2. However, one of the control programs may also make use of an input/output process mediated by only one of the PLC system bus 11 and the field network 2. For example, the control program 1 may make use of the input/output process in which the first output data and the first input data are mediated only by the PLC system bus 11 and the control program 2 may make use of the input/output process in which the second output data and the second input data are mediated only by the field network 2. In such a case, the control program 1 uses the first input data to generate the first output data and the control program 2 uses the second input data to generate the second output data. Also, in such a case, the period of an effective input/output process will differ between the input/output process mediated by the PLC system bus 11 and the input/output process mediated by the field network 2.

Moreover, as shown in FIG. 7, as a modification of Embodiment 5, a time where the input copy process is performed may be configured to be immediately before execution of the control program and a time where the output copy process is performed may be configured to be immediately after execution of the control program. When such a configuration is used, the timing of effective input/output may drop out of sync with the execution cycle of the control program. However, the control program may use the most recent input data and be able to transmit the output data to the instruments more quickly after execution of the control program ends.

For example, the control program 2, which is executed in the control cycle 2 shown in FIGS. 18 and 19, uses the input data input in the control cycle 2 and the output data generated by the control program 2 is output in the control cycle 3.

L. Support Device

Next, a description is given for the PLC support device 8 performing creation of a program executed by the PLC 1, maintenance of the PLC 1, and the like.

Figure 21:
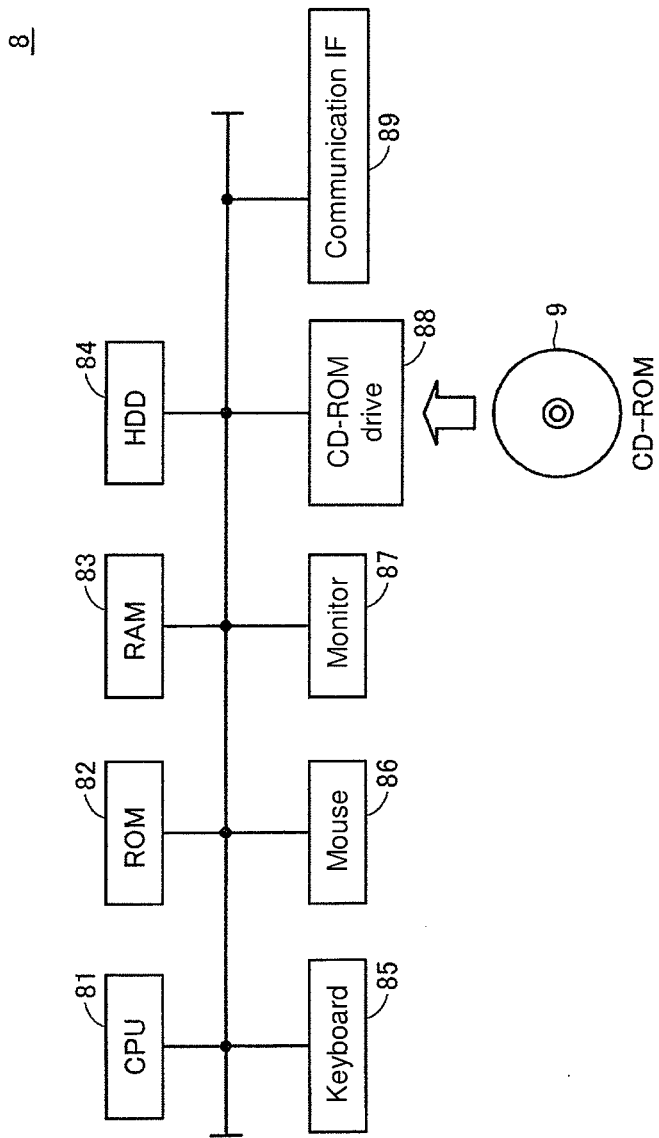
FIG. 21 is a schematic view illustrating a hardware configuration of a PLC support device connected to and used with the CPU unit according to the embodiments of the present invention.

FIG. 21 is a schematic view illustrating a hardware configuration of the PLC support device 8 connected to and used with the CPU unit according to the embodiments of the present invention. With reference to FIG. 21, the PLC support device 8 is typically configured with a general-purpose computer. From a viewpoint of maintainability, a laptop-type personal computer excellent in portability is preferable.

With reference to FIG. 21, the PLC support device 8 includes a CPU 81 executing various programs including an OS, a ROM (Read Only Memory) 82 storing BIOS and various data, a memory RAM 83 providing a work area that stores data required for execution of a program by the CPU 81, and a hard disk (HDD) 84 storing, in a non-volatile manner, a program and the like executed by the CPU 81.

The PLC support device 8 further includes a keyboard 85 and a mouse 86 receiving operation by a user, and a monitor 87 displaying information to the user. Furthermore, the PLC support device 8 includes a communication interface (IF) 89 to communicate with the PLC 1 (CPU unit 13) and the like.

As described later, the various programs executed in the PLC support device 8 are stored in a CD-ROM 9 for distribution. The programs stored in this CD-ROM 9 are read by a CD-ROM (Compact Disk-Read Only Memory) drive 88 and is stored in the hard disk (HDD) 84 and the like. Alternatively, a program may be downloaded via a network from a superordinate host computer and the like.

As described above, the PLC support device 8 is embodied with a general-purpose computer, and a further description for the PLC support device 8 is thus omitted.

Figure 22:
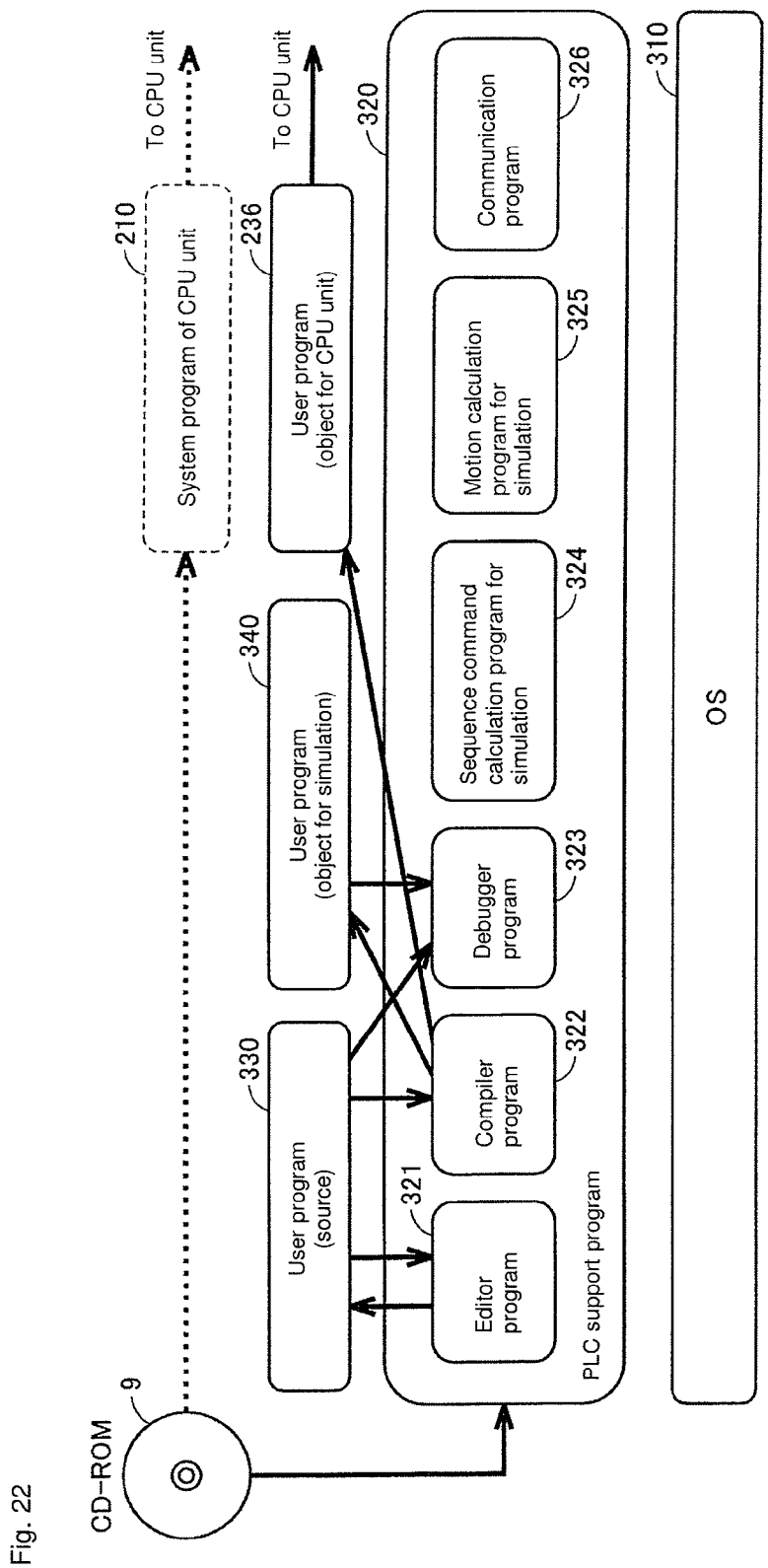
FIG. 22 is a schematic view illustrating a software configuration of the PLC support device connected to and used with the CPU unit according to the embodiments of the present invention.

FIG. 22 is a schematic view illustrating a software configuration of the PLC support device 8 connected to and used with the CPU unit according to the embodiments of the present invention. With reference to FIG. 22, an OS 310 is executed in the PLC support device 8 in order to provide an environment in which various programs included in a PLC support program 320 can be executed.

The PLC support program 320 includes an editor program 321, a compiler program 322, a debugger program 323, a sequence command calculation program for simulation 324, a motion calculation program for simulation 325, and a communication program 326. Each program included in the PLC support program 320 is typically distributed in a state of being stored in the CD-ROM 9 and is installed in the PLC support device 8.

The editor program 321 provides a function such as input and edit functions to create a user program 236. More specifically, in addition to a function with which a user creates a source program 330 of the user program 236 by operating the keyboard 85 and the mouse 86, the editor program 321 provides functions to save and edit the created source program 330. Further, the editor program 321 receives input of the source program 330 from outside.

The compiler program 322 compiles the source program 330 to provide a function generating the user program 236 in an object program format that can be executed by the microprocessor 100 of the CPU unit 13. In addition, the compiler program 322 compiles the source program 330 to provide a function generating a user program 340 in an object program format that can be executed by the CPU 81 of the PLC support device 8. This user program 340 is an object program for simulation used to simulate (imitate) operation of the PLC 1 with the PLC support device 8.

The debugger program 323 provides a function debugging a source program of a user program. The debugging includes operations such as partial execution of a user-designated portion of a source program and tracking of temporal change in a variable value during execution of the source program.

The debugger program 323 further provides a function executing the user program 340, which is an object program for simulation. At the time of the simulation, the sequence command calculation program for simulation 324 and the motion calculation program for simulation 325 included in the PLC support program 320 are used in replacement of the sequence command calculation program 232 and the motion calculation program 234 included in the system program of the CPU unit 13.

The communication program 326 provides a function transferring the user program 236 to the CPU unit 13 of the PLC 1.

In general, the system program 210 provided to the PLC 1 is stored in the non-volatile memory 106 of the CPU unit 13 at a stage of manufacturing the CPU unit 13. However, when the system program 210 is stored in the CD-ROM 9, the user can copy the system program 210 in the CD-ROM 9 to the PLC support device 8 and transfer the copied system program 210 to the CPU unit 13 using the function provided by the communication program 326. Moreover, when the realtime OS 200 to be executed by the CPU unit 13 of the PLC 1 is stored in the CD-ROM 9, the realtime OS 200 can be also re-installed in the PLC 1 by a user operation.

The embodiments disclosed here should be considered as examples and not as limitation of the present invention in all aspects. The scope of the present invention is indicated not by the description above but by the scope of claims. The scope of the present invention is intended to include all modifications without departing from the scope of the claims and the meaning and scope of equivalents.

DESCRIPTION OF REFERENCE NUMERALS

1 PLC, 2 Field network, 3 Servo motor driver, 4 Servo motor, 5 Remote I/O terminal, 6 Detection switch, 7 Relay, 8 PLC support device, 9 CD-ROM, 10 Connection cable, 11 PLC system bus, 12 Power supply unit, 13 CPU unit, 14, 53 I/O/O unit, 15 Specialty unit, 51 Terminal bus, 52 Communication coupler, 81 CPU, 83 RAM, 85 Keyboard, 86 Mouse, 87 Monitor, 88 CD-ROM drive, 100 Microprocessor, 102 Chip set, 104 Main memory, 106 Non-volatile memory, 108 System timer, 110 USB connector, 120 PLC system bus controller, 122, 142 DMA control circuit, 124 PLC system bus communication control circuit, 126 First communication circuit buffer, 130 Connector, 140 Field network controller, 144 Field network communication control circuit, 146 Second communication circuit buffer, 200 Realtime OS, 210 System program, 212 Scheduler program, 214 Output processing program, 216 Input processing program, 218 I/O processing program, 220 Other system program, 230 Control program, 232 Sequence command calculation program, 234 Motion calculation program, 236, 340 User program, 320 Support program, 321 Editor program, 322 Compiler program, 323 Debugger program, 324 Sequence command calculation program for simulation, 325 Motion calculation program for simulation, 326 Communication program, 330 Source program, 1041 Program area, 1042 Control program work area, 1043 Calculation buffer, 1044 First transfer buffer, 1045 Second transfer buffer, SYS PLC system.

The invention claimed is:

1. A central processing unit (CPU) of a programmable logic controller (PLC) controlling a control target, the CPU comprising:
    a microprocessor;
    a memory having a main memory of the microprocessor;
    a first communication circuit transmitting first output data and receiving first input data with a PLC system bus; and
    a second communication circuit transmitting second output data and receiving second input data with a field network, wherein
    the CPU of the PLC is configured to control the control target by repeating transmission of the first output data and the second output data, reception of the first input data and the second input data, and execution of a control program that uses the first input data and the second input data to generate the first output data and the second output data,
    the memory is used for storage of the control program and a system program,
    the microprocessor executes the system program and the control program stored in the memory,
    the system program includes a command generating, in the main memory, a calculation buffer in which, accompanying execution of the control program, the first input data and the second input data are read and the first output data and the second output data are written; a first transfer buffer storing the first output data transmitted by the PLC system bus and the first input data received by the PLC system bus; and a second transfer buffer storing the second output data transmitted by the field network and the second input data received by the field network,
    the system program further includes a command controlling execution of the control program and a command controlling input/output of the first input data, the second input data, the first output data, and the second output data,
    the microprocessor controls, by executing the system program, execution of:
        an output copy process copying the first output data from the calculation buffer to the first transfer buffer and copying the second output data from the calculation buffer to the second transfer buffer; and
        an input copy process copying the first input data from the first transfer buffer to the calculation buffer and copying the second input data from the second transfer buffer to the calculation buffer, and
    the microprocessor controls, by executing the system program, at least one of the first communication circuit and the second communication circuit such that a first input/output process and a second input/output process are executed in parallel, wherein
    the first input/output process includes a process outputting the first output data from the first transfer buffer, through the first communication circuit, to a first instrument in the PLC system bus, and a process inputting the first input data from the first instrument, through the first communication circuit, to the first transfer buffer, and
    the second input/output process includes a process outputting the second output data from the second transfer buffer, through the second communication circuit, to a second instrument in the field network, and a process inputting the second input data from the second instrument, through the second communication circuit, to the second transfer buffer.

2. The CPU of the PLC according to claim 1, wherein the first communication circuit includes a first communication circuit buffer,
    the second communication circuit includes a second communication circuit buffer,
    the first input/output process comprises:
        a first output transfer process transferring the first output data from the first transfer buffer to the first communication circuit buffer;
        a first transmission process transmitting the first output data from the first communication circuit buffer to the first instrument;
        a first reception process receiving the first input data from the first instrument to the first communication circuit buffer; and
        a first input transfer process transferring the first input data from the first communication circuit buffer to the first transfer buffer, and
    the second input/output process comprises:
        a second output transfer process transferring the second output data from the second transfer buffer to the second communication circuit buffer;
        a second transmission process transmitting the second output data from the second communication circuit buffer to the second instrument;
        a second reception process receiving the second input data from the second instrument to the second communication circuit buffer; and
        a second input transfer process transferring the second input data from the second communication circuit buffer to the second transfer buffer.

3. The CPU of the PLC according to claim 2, wherein the microprocessor controls, by executing the system program, at least one of the first communication circuit and the second communication circuit such that, during a period from one of the first output transfer process and the second output transfer process being initiated until the input transfer process corresponding to the output transfer process is completed, the other of the output transfer processes is initiated.

4. The CPU of the PLC according to claim 2, wherein the microprocessor controls, by executing the system program, at least one of the first communication circuit and the second communication circuit such that, during a period from one of a first transmission/reception process, the first transmission/reception process being the first transmission process and the first reception process, and a second transmission/reception process, the second transmission/reception process being the second transmission process and the second reception process, being initiated until the transmission/ reception process is completed, the other of the transmission/reception processes is initiated.

5. The CPU of the PLC according to claim 1, wherein the first input/output process comprises:
   a first output process outputting the first output data from the first transfer buffer to the first instrument; and
   a first input process inputting the first input data from the first instrument to the first transfer buffer,
the second input/output process comprises:
   a second output process outputting the second output data from the second transfer buffer to the second instrument; and
   a second input process inputting the second input data from the second instrument to the second transfer buffer, and
the microprocessor performs control, by executing the system program, such that at least one is performed of parallel execution of the first output process and the second output process and parallel execution of the first input process and the second input process.

6. The CPU of the PLC according to claim 2, wherein the microprocessor controls, by executing the system program, at least one of the first communication circuit and the second communication circuit such that, during a period from one of the first output transfer process and the second output transfer process being initiated until the transmission process corresponding to the output transfer process is completed, the other of the output transfer processes is initiated.

7. The CPU of the PLC according to claim 2, wherein the microprocessor controls, by executing the system program, at least one of the first communication circuit and the second communication circuit such that, during a period from one of the first transmission process and the second transmission process being initiated until the transmission process is completed, the other of the transmission processes is initiated.

8. The CPU of the PLC according to claim 2, wherein the microprocessor controls, by executing the system program, at least one of the first communication circuit and the second communication circuit such that, during a period from one of the first reception process and the second reception process being initiated until the input transfer process corresponding to the reception process is completed, the other of the reception processes is initiated.

9. The CPU of the PLC according to claim 2, wherein the microprocessor controls, by executing the system program, at least one of the first communication circuit and the second communication circuit such that, during a period from one of the first reception process and the second reception process being initiated until the reception process is completed, the other of the reception processes is initiated.

10. A system having a programmable logic controller (PLC) in a central processing unit (CPU) of the PLC, the system including a program being stored in a memory and being executed by a microprocessor, wherein
the CPU comprises:
   the microprocessor;
   the memory having a main memory of the microprocessor;
   a first communication circuit transmitting first output data and receiving first input data with a PLC system bus; and
   a second communication circuit transmitting second output data and receiving second input data with a field network,
the CPU controls a control target by repeating transmission of the first output data and the second output data, reception of the first input data and the second input data, and execution of a control program stored in the memory and using the first input data and the second input data to generate the first output data and the second output data,
the system program includes, as an execution preparation command of a control operation, a command generating, in the main memory, a calculation buffer in which, accompanying execution of the control program, the first input data and the second input data are read and the first output data and the second output data are written; a first transfer buffer storing the first output data transmitted by the PLC system bus and the first input data received by the PLC system bus; and a second transfer buffer storing the second output data transmitted by the field network and the second input data received by the field network, and
the system program comprises, as an execution control command of the control operation:
   a control program initiation command initiating execution of the control program;
   a first output copy command for copying the first output data from the calculation buffer to the first transfer buffer;
   a second output copy command for copying the second output data from the calculation buffer to the second transfer buffer;
   a first input copy command for copying the first input data from the first transfer buffer to the calculation buffer;
   a second input copy command for copying the second input data from the second transfer buffer to the calculation buffer; and
   an input/output control command comprising at least one of:
      a first input/output control command for controlling the first communication circuit; and
      a second input/output control command for controlling the second communication circuit,
      the input/output control command being configured such that a first input/output process and a second input/output process are executed in parallel, wherein
         the first input/output process includes a process outputting the first output data from the first transfer buffer, through the first communication circuit, to a first instrument in the PLC system bus, and a process inputting the first input data from the first instrument, through the first communication circuit, to the first transfer buffer, and
         the second input/output process includes a process outputting the second output data from the second transfer buffer, through the second communication circuit, to a second instrument in the field network, and a process inputting the second input data from the second instrument, through the second communication circuit, to the second transfer buffer.

11. The system according to claim 10, wherein
the first communication circuit includes a first communication circuit buffer,
the second communication circuit includes a second communication circuit buffer,
the first input/output process comprises:

a first output transfer process transferring the first output data from the first transfer buffer to the first communication circuit buffer;
a first transmission process transmitting the first output data from the first communication circuit buffer to the first instrument;
a first reception process receiving the first input data from the first instrument to the first communication circuit buffer; and
a first input transfer process transferring the first input data from the first communication circuit buffer to the first transfer buffer,
the second input/output process comprises:
a second output transfer process transferring the second output data from the second transfer buffer to the second communication circuit buffer;
a second transmission process transmitting the second output data from the second communication circuit buffer to the second instrument;
a second reception process receiving the second input data from the second instrument to the second communication circuit buffer; and
a second input transfer process transferring the second input data from the second communication circuit buffer to the second transfer buffer,
the first input/output control command includes any of a first output transfer command initiating the first output transfer process, a first transmission command initiating the first transmission process, a first reception command initiating the first reception process, a first transmission/reception command initiating the first transmission process and the first reception process, and a first input transfer command initiating the first input transfer process, and
the second input/output control command includes any of a second output transfer command initiating the second output transfer process, a second transmission command initiating the second transmission process, a second reception command initiating the second reception process, a second transmission/reception command initiating the second transmission process and the second reception process, and a second input transfer command initiating the second input transfer process.

12. The system program according to claim 11, wherein the system program includes the first output transfer command and the second output transfer command, and is programmed such that, during a period from one of the output transfer commands being executed until the input transfer process corresponding to the output transfer process initiated thereby is completed, the other of the output transfer commands is executed.

13. The system according to claim 11, wherein the system program includes the first transmission/reception command and the second transmission/reception command, and is programmed such that, during a period from one of the transmission/reception commands being executed until the transmission/reception process initiated thereby is completed, the other of the transmission/reception commands is executed.

14. The system according to claim 10, wherein
the first input/output process comprises:
a first output process outputting the first output data from the first transfer buffer to the first instrument; and
a first input process inputting the first input data from the first instrument to the first transfer buffer,
the second input/output process comprises:
a second output process outputting the second output data from the second transfer buffer to the second instrument; and
a second input process inputting the second input data from the second instrument to the second transfer buffer,
the first input/output control command includes a first output command initiating the first output process and a first input command initiating the first input process,
the second input/output control command includes a second output command initiating the second output process and a second input command initiating the second input process, and
the system program comprising at least one of:
parallel execution of the first output process and the second output process by executing the first output command and the second output command; and
parallel execution of the first input process and the second input process by executing the first input command and the second input command.

15. The system according to claim 11, wherein the system program includes the first output transfer command and the second output transfer command, and is programmed such that, during a period from one of the output transfer commands being executed until the transmission process corresponding to the output transfer process initiated thereby is completed, the other of the output transfer commands is executed.

16. The system according to claim 11, wherein the system program includes the first transmission command and the second transmission command, and is programmed such that, during a period from one of the transmission commands being executed until the transmission process initiated thereby is completed, the other of the transmission commands is executed.

17. The system according to claim 11, wherein the system program includes the first reception command and the second reception command, and is programmed such that, during a period from one of the reception commands being executed until the input transfer process corresponding to the reception process initiated thereby is completed, the other of the reception commands is executed.

18. The system according to claim 11, wherein the system program includes the first reception command and the second reception command, and is programmed such that, during a period from one of the reception commands being executed until the reception process initiated thereby is completed, the other of the reception commands is executed.

19. A non-transitory computer readable storage medium storing a system program for a programmable logic controller (PLC) in a central processing unit (CPU) of the PLC, the system program being executable by a microprocessor, wherein
the CPU comprises:
the microprocessor;
a memory having a main memory of the microprocessor;
a first communication circuit transmitting first output data and receiving first input data with a PLC system bus; and
a second communication circuit transmitting second output data and receiving second input data with a field network,
the CPU controls a control target by repeating transmission of the first output data and the second output data, reception of the first input data and the second input data, and execution of a control program stored in the memory and using the first input data and the second input data to generate the first output data and the second output data, the system program includes, as an execution preparation command of a control operation, a command generating, in the main memory, a calculation buffer in which, accompanying execution of the control program, the first input data and the second input data are read and the first output data and the second output data are written; a first transfer buffer storing the first output data transmitted by the PLC system bus and the first input data received by the PLC system bus; and a second transfer buffer storing the second output data transmitted by the field network and the second input data received by the field network, and the system program comprises, as an execution control command of the control operation:

a control program initiation command initiating execution of the control program;

a first output copy command for copying the first output data from the calculation buffer to the first transfer buffer;

a second output copy command for copying the second output data from the calculation buffer to the second transfer buffer;

a first input copy command for copying the first input data from the first transfer buffer to the calculation buffer;

a second input copy command for copying the second input data from the second transfer buffer to the calculation buffer; and an input/output control command comprising at least one of:

a first input/output control command for controlling the first communication circuit; and a second input/output control command for controlling the second communication circuit, the input/output control command being configured such that a first input/output process and a second input/output process are executed in parallel, wherein the first input/output process includes a process outputting the first output data from the first transfer buffer, through the first communication circuit, to a first instrument in the PLC system bus, and a process inputting the first input data from the first instrument, through the first communication circuit, to the first transfer buffer, and the second input/output process includes a process outputting the second output data from the second transfer buffer, through the second communication circuit, to a second instrument in the field network, and a process inputting the second input data from the second instrument, through the second communication circuit, to the second transfer buffer.

20. The non-transitory computer readable storage medium storing the system program for the PLC according to claim 19, wherein the first communication circuit includes a first communication circuit buffer, the second communication circuit includes a second communication circuit buffer, the first input/output process comprises:

a first output transfer process transferring the first output data from the first transfer buffer to the first communication circuit buffer;

a first transmission process transmitting the first output data from the first communication circuit buffer to the first instrument;

a first reception process receiving the first input data from the first instrument to the first communication circuit buffer; and a first input transfer process transferring the first input data from the first communication circuit buffer to the first transfer buffer, the second input/output process comprises:

a second output transfer process transferring the second output data from the second transfer buffer to the second communication circuit buffer;

a second transmission process transmitting the second output data from the second communication circuit buffer to the second instrument;

a second reception process receiving the second input data from the second instrument to the second communication circuit buffer; and a second input transfer process transferring the second input data from the second communication circuit buffer to the second transfer buffer, the first input/output control command includes any of a first output transfer command initiating the first output transfer process, a first transmission command initiating the first transmission process, a first reception command initiating the first reception process, a first transmission/reception command initiating the first transmission process and the first reception process, and a first input transfer command initiating the first input transfer process, and the second input/output control command includes any of a second output transfer command initiating the second output transfer process, a second transmission command initiating the second transmission process, a second reception command initiating the second reception process, a second transmission/reception command initiating the second transmission process and the second reception process, and a second input transfer command initiating the second input transfer process.

21. The non-transitory computer readable storage medium storing the system program for the PLC according to claim 20, wherein the system program includes the first output transfer command and the second output transfer command, and is programmed such that, during a period from one of the output transfer commands being executed until the input transfer process corresponding to the output transfer process initiated thereby is completed, the other of the output transfer commands is executed.

22. The non-transitory computer readable storage medium storing the system program for the PLC according to claim 20, wherein the system program includes the first transmission/reception command and the second transmission/reception command, and is programmed such that, during a period from one of the transmission/reception commands being executed until the transmission/reception process initiated thereby is completed, the other of the transmission/reception commands is executed.

23. The non-transitory computer readable storage medium storing the system program for the PLC according to claim 19, wherein the first input/output process comprises:

a first output process outputting the first output data from the first transfer buffer to the first instrument; and a first input process inputting the first input data from the first instrument to the first transfer buffer, the second input/output process comprises:
- a second output process outputting the second output data from the second transfer buffer to the second instrument; and
- a second input process inputting the second input data from the second instrument to the second transfer buffer, the first input/output control command includes a first output command initiating the first output process and a first input command initiating the first input process, the second input/output control command includes a second output command initiating the second output process and a second input command initiating the second input process, and the system program comprising at least one of:
- parallel execution of the first output process and the second output process by executing the first output command and the second output command; and
- parallel execution of the first input process and the second input process by executing the first input command and the second input command.

24. The non-transitory computer readable storage medium storing the system program for the PLC according to claim 20, wherein the system program includes the first output transfer command and the second output transfer command, and is programmed such that, during a period from one of the output transfer commands being executed until the transmission process corresponding to the output transfer process initiated thereby is completed, the other of the output transfer commands is executed.

25. The non-transitory computer readable storage medium storing the system program for the PLC according to claim 20, wherein the system program includes the first transmission command and the second transmission command, and is programmed such that, during a period from one of the transmission commands being executed until the transmission process initiated thereby is completed, the other of the transmission commands is executed.

26. The non-transitory computer readable storage medium storing the system program for the PLC according to claim 20, wherein the system program includes the first reception command and the second reception command, and is programmed such that, during a period from one of the reception commands being executed until the input transfer process corresponding to the reception process initiated thereby is completed, the other of the reception commands is executed.

27. The non-transitory computer readable storage medium storing the system program for the PLC according to claim 20, wherein the system program includes the first reception command and the second reception command, and is programmed such that, during a period from one of the reception commands being executed until the reception process initiated thereby is completed, the other of the reception commands is executed.

* * * * *